United States Patent
Ogino et al.

(10) Patent No.: US 9,505,962 B2
(45) Date of Patent: Nov. 29, 2016

(54) ADHESIVE COMPOSITION CONTAINING RESIN HAVING CARBON-CARBON MULTIPLE BOND

(75) Inventors: Hiroshi Ogino, Toyama (JP); Mamoru Tamura, Toyama (JP); Tomoyuki Enomoto, Toyama (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 85 days.

(21) Appl. No.: 13/814,386

(22) PCT Filed: Jul. 29, 2011

(86) PCT No.: PCT/JP2011/067466
§ 371 (c)(1),
(2), (4) Date: Feb. 5, 2013

(87) PCT Pub. No.: WO2012/020655
PCT Pub. Date: Feb. 16, 2012

(65) Prior Publication Data
US 2013/0177763 A1    Jul. 11, 2013

(30) Foreign Application Priority Data

Aug. 10, 2010 (JP) .................. 2010-179369
Nov. 15, 2010 (JP) .................. 2010-254767

(51) Int. Cl.
| C08G 75/00 | (2006.01) |
| C09J 171/12 | (2006.01) |
| C09J 171/08 | (2006.01) |
| C08G 65/40 | (2006.01) |
| C09J 171/00 | (2006.01) |
| C08L 71/00 | (2006.01) |
| C08G 65/00 | (2006.01) |

(52) U.S. Cl.
CPC ............ *C09J 171/12* (2013.01); *C08G 65/007* (2013.01); *C08G 65/40* (2013.01); *C08G 65/4012* (2013.01); *C08L 71/00* (2013.01); *C09J 171/00* (2013.01); *C09J 171/08* (2013.01); *C08G 2650/40* (2013.01); *C08G 2650/60* (2013.01); *Y10T 428/269* (2015.01)

(58) Field of Classification Search
CPC ...... C08G 65/40; C08G 75/20; C08G 75/23; C09D 181/06
USPC ............................ 528/86, 374, 373
See application file for complete search history.

(56) References Cited

U.S. PATENT DOCUMENTS

| 5,457,169 A | 10/1995 | Weber et al. |
| 2003/0171527 A1 | 9/2003 | Burgoyne, Jr. |
| 2010/0046615 A1 | 2/2010 | Chen et al. |

FOREIGN PATENT DOCUMENTS

| EP | 0 513 488 A1 | 11/1992 | |
| JP | A 62-501370 | 6/1987 | |
| JP | A 4-233939 | 8/1992 | |
| JP | A 6-322255 | 11/1994 | |
| JP | A 2003-231750 | 8/2003 | |
| JP | 2005264008 | * 9/2005 | ............. C08G 65/40 |
| JP | A 2005-264008 | 9/2005 | |
| JP | A 2009-70875 | 4/2009 | |
| JP | A 2010-65097 | 3/2010 | |
| JP | A 2010-280781 | 12/2010 | |
| TW | 200301768 A | 7/2003 | |
| WO | WO 2006/137369 A1 | 12/2006 | |

OTHER PUBLICATIONS

Sep. 13, 2011 Search Report issued in International Patent Application No. PCT/JP2011/067466 (with translation).
Oct. 26, 2015 Office Action issued in Chinese Application No. 201180039192.1.

* cited by examiner

*Primary Examiner* — Shane Fang
(74) *Attorney, Agent, or Firm* — Oliff PLC

(57) ABSTRACT

An adhesive composition has a polymer that contains a unit structure of Formula (1):

$$-\!\!\!-\!\!L^1\!-\!O\!-\!T^1\!-\!O\!-\!\!\!\!-\quad\text{Formula (1)}$$

where $L^1$ is an arylene group or a combination of an arylene group and a sulfonyl group or a carbonyl group, and $T^1$ is a fluoroalkylene group, a cyclic alkylene group, an arylene group having a substituent, or a combination of an arylene group optionally having a substituent and a fluoroalkylene group or a cyclic alkylene group and contains, at a terminal or in a side chain or the main chain, at least one group containing a structure of Formula (2-A), a structure of Formula (2-B), or both structures:

—C≡C—    Formula (2-A)

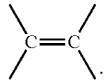

Formula (2-B)

17 Claims, No Drawings

ADHESIVE COMPOSITION CONTAINING RESIN HAVING CARBON-CARBON MULTIPLE BOND

TECHNICAL FIELD

The present invention relates to an adhesive composition. More specifically, the present invention relates to an adhesive composition for bonding layers to each other in a step of forming a laminate in IC chips and other semiconductor products, optical products, or the like.

BACKGROUND ART

In recent years, along with the trend toward higher functionality and a smaller size of electronic equipment such as cellular phones and IC cards, semiconductor devices have been required to have enhanced integration. In order to achieve this, studies have been conducted on finer semiconductors and a stacked structure in which a semiconductor element is stacked onto another.

In the fabrication of the stacked structure, semiconductor elements are bonded by an adhesive. Known adhesives such as acrylic resins, epoxy resins, and silicone resins have, however, heat resistance of as low as about 250° C. and therefore are not usable in steps subjected to high temperatures of 250° C. or higher such as a step of bonding a metal bump to an electrode and an ion diffusion step.

To improve heat resistance, for example, a substrate for thick film technology obtained by forming, on an inorganic insulating substrate that is a glass base material impregnated with a silicone resin, an undercoat containing 30% by volume to 45% by volume of a polyether ether ketone resin powder and a thermosetting resin is disclosed (Patent Document 1).

An adhesive that is used in a flexible printed circuit board and includes a polymer containing a polyimide-based main chain and a functional terminal group having a carbon-carbon triple bond is disclosed (Patent Document 2).

An adhesive composition that includes a polymer containing, in the main chain, a phenyl group, urea, an amido group, and the like, and a functional group having a carbon-carbon triple bond is disclosed (Patent Document 3).

An adhesive composition that includes a polymer containing polyether ether sulfone having a sulfonic group and polyether ether ketone is disclosed (Patent Document 4).

RELATED ART DOCUMENTS

Patent Documents

Patent Document 1: Japanese Patent Application Publication No. 2009-070875 (JP 2009-070875 A)
Patent Document 2: International Publication No. WO 2006-137369 pamphlet
Patent Document 3: Japanese Patent Application Publication No. 2010-065097 (JP 2010-065097 A)
Patent Document 4: Japanese Patent Application Publication No. 2005-264008 (JP 2005-264008 A)

SUMMARY OF THE INVENTION

Problem to be Solved by the Invention

As described above, known adhesives such as acrylic resins, epoxy resins, and silicone resins have heat resistance of as low as about 250° C. and therefore are not usable at high temperatures of 250° C. or higher.

To improve heat resistance, as disclosed in Patent Documents 1 to 4 and the like, adhesives including an aromatic polyether such as polyether ether ketones are suggested. Common polyether ether ketones are low in solubility in solvents and resin solutions and therefore cannot form an adhesive for application use, so they are formed into ink paste, for example, to coat a material to be bonded by screen printing. An excessive content of polyether ether ketone resins, however, renders the ink not usable in screen printing. Therefore, in Patent Document 1, for example, the content of polyether ether ketone is limited to 30% by volume to 45% by volume, which is, however, not enough to solve the problem in heat resistance.

Thus, aromatic polyethers such as polyether ether ketone have extremely low solvent solubility, virtually no solubility, and therefore are low in solvent selectivity, are less capable of forming thicker films, and have inadequate coating properties.

In order to improve solvent solubility, suggestions have been made to introduce a flexible structure typified by long-chain alkyl. However, heat resistance degrades in most cases.

The present invention is devised considering the above problems, and an object of the present invention is to provide a highly heat-resistant adhesive composition that easily dissolves in various organic solvents, has excellent coating properties, and can form a thick-enough adhesive layer and that undergoes little thermogravimetric loss during high-temperature processes such as steps of metal bump bonding, CVD, and ion diffusion and achieves excellent bonding.

Means for Solving the Problem

The present invention provides:

as a first aspect, an adhesive composition including a polymer that contains a unit structure of Formula (1):

  Formula (1)

(where $L^1$ is an arylene group or a combination of an arylene group and a sulfonyl group or a carbonyl group, and $T^1$ is a fluoroalkylene group, a cyclic alkylene group, an arylene group having a substituent, or a combination of an arylene group optionally having a substituent and a fluoroalkylene group or a cyclic alkylene group) and contains, at a terminal or in a side chain or the main chain, at least one group containing a structure of Formula (2-A), a structure of Formula (2-B), or both structures:

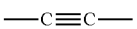  Formula (2-A)

  Formula (2-B)

as a second aspect, the adhesive composition according to the first aspect in which the arylene groups in $L^1$ and $T^1$ are independently a phenylene group, a naphthylene group, or an anthrylene group;

as a third aspect, the adhesive composition according to the first aspect or the second aspect in which the polymer is a homopolymer containing one kind of unit structure;

as a fourth aspect, the adhesive composition according to the first aspect or the second aspect in which the polymer is a copolymer containing at least two kinds of unit structures;

as a fifth aspect, the adhesive composition according to any one of the first aspect to the fourth aspect including a polymer that contains the unit structure of Formula (1) with $L^1$ being a divalent group of Formula (3) or a polymer that contains the unit structure of Formula (1) with $L^1$ being a divalent group of Formula (4):

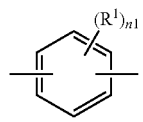

Formula (3)

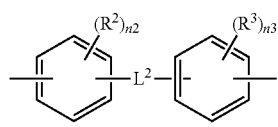

Formula (4)

(where $R^1$, $R^2$, and $R^3$ are independently a $C_{1-10}$ alkyl group, a $C_{1-4}$ fluoroalkyl group, a hydroxy group, an allyl group, an allyloxy group, an amino group, a cyano group, a nitro group, an acyl group, an acyloxy group, a carboxy group, a group containing a tertiary-carbon structure, a cyclic alkyl group, or a combination of these, $L^2$ is a sulfonyl group, a carbonyl group, an ester group, an amido group, a sulfinyl group, or a sulfonamido group, and each of n1, n2, and n3 is an integer of 0 to 4);

as a sixth aspect, the adhesive composition according to any one of the first aspect, the second aspect, and the fourth aspect including a polymer that contains a combination of the unit structure of Formula (1) with $L^1$ being the divalent group of Formula (3) in the fifth aspect and the unit structure of Formula (1) with $L^1$ being the divalent group of Formula (4) in the fifth aspect;

as a seventh aspect, the adhesive composition according to any one of the first aspect to the sixth aspect including a polymer that contains the unit structure of Formula (1) with $T^1$ being a divalent group of Formula (5) or a polymer that contains the unit structure of Formula (1) with $T^1$ being a divalent group of Formula (6):

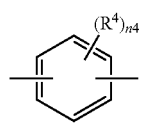

Formula (5)

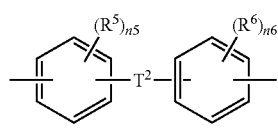

Formula (6)

(where $R^4$, $R^5$, and $R^6$ are independently a $C_{1-10}$ alkyl group, a $C_{1-4}$ fluoroalkyl group, a hydroxy group, an allyl group, an allyloxy group, an amino group, a cyano group, a nitro group, an acyl group, an acyloxy group, a carboxy group, a group containing a tertiary-carbon structure, a cyclic alkyl group, or a combination of these, each of n4, n5, and n6 is an integer of 0 to 4, and $T^2$ is a fluoroalkylene group, a cyclic alkylene group, or a combination of these);

as an eighth aspect, the adhesive composition according to any one of the first aspect, the second aspect, and the fourth aspect to the sixth aspect including a polymer that contains a combination of the unit structure of Formula (1) with $T^1$ being the divalent group of Formula (5) in the seventh aspect and the unit structure of Formula (1) with $T^1$ being the divalent group of Formula (6) in the seventh aspect;

as a ninth aspect, the adhesive composition according to the fifth aspect or the sixth aspect in which, in Formula (3), $R^1$ has at least a cyano group and n1 is an integer of 1 to 4;

as a tenth aspect, the adhesive composition according to the seventh aspect or the eighth aspect in which, in Formula (3), $R^1$ has at least a cyano group and n1 is an integer of 1 to 4;

as an eleventh aspect, the adhesive composition according to the fifth aspect or the sixth aspect in which, in Formula (4), $L^2$ is a sulfonyl group or a carbonyl group;

as a twelfth aspect, the adhesive composition according to the seventh aspect or the eighth aspect in which, in Formula (4), $L^2$ is a sulfonyl group or a carbonyl group;

as a thirteenth aspect, the adhesive composition according to any one of the first aspect, the second aspect, and the fourth aspect to the twelfth aspect further including a polymer that contains a unit structure of Formula (7):

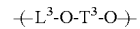

Formula (7)

(where $L^3$ is the divalent group of Formula (3) or Formula (4), and $T^3$ is an alkylene group, a sulfonyl group, a carbonyl group, a $C_{6-30}$ arylene group, or a combination of these);

as a fourteenth aspect, the adhesive composition according to the thirteenth aspect in which the arylene group is a phenylene group, a naphthylene group, or an anthrylene group;

as a fifteenth aspect, the adhesive composition according to the thirteenth aspect or the fourteenth aspect in which $T^3$ is a divalent group of Formula (8):

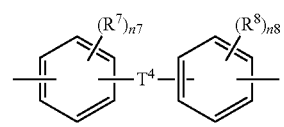

Formula (8)

(where each of $R^7$ and $R^8$ is a $C_{1-10}$ alkyl group, a $C_{1-4}$ fluoroalkyl group, a hydroxy group, an allyl group, an allyloxy group, an amino group, a cyano group, a nitro group, an acyl group, an acyloxy group, a carboxy group, a group containing a tertiary-carbon structure, a cyclic alkyl group, or a combination of these, each of n7 and n8 is an integer of 0 to 4, and $T^4$ is an alkylene group, a sulfonyl group, a carbonyl group, a $C_{6-30}$ arylene group, or a combination of these);

as a sixteenth aspect, the adhesive composition according to any one of the fifth aspect to the fifteenth aspect in which the group containing a tertiary-carbon structure is a tertiary butyl group;

as a seventeenth aspect, the adhesive composition according to any one of the first aspect to the sixteenth aspect in which the weight average molecular weight of the polymer is 500 to 5,000,000;

as an eighteenth aspect, the adhesive composition according to any one of the first aspect to the seventeenth aspect further including a solvent, in which the adhesive composition has a viscosity of 0.001 to 5,000 Pa·s;

as a nineteenth aspect, a laminate including an adhesive layer formed from the adhesive composition according to any one of the first aspect to the seventeenth aspect, the adhesive layer being interposed between a first material being bonded and a second material being bonded that is of the same kind as or of a different kind from the first material, in which the adhesive layer has a thickness of 0.1 µm to 200 µm; and as a twentieth aspect, the laminate according to the nineteenth aspect in which the materials being bonded are each a silicon substrate, a glass substrate, a resin substrate, or a ceramic substrate.

Effects of the Invention

According to the present invention, an adhesive composition that easily dissolves in various solvents and can achieve excellent coating properties can be obtained.

The polymer used in the adhesive composition of the present invention has a polyether structure such as a polyether ether ketone structure, a polyether ether sulfone structure, and a polyether ether arylene structure, and therefore can make the adhesive composition be capable of forming an adhesive layer that is thick enough for bonding, undergoes little thermogravimetric loss during high-temperature processes such as steps of metal bump bonding, CVD, and ion diffusion, and achieves excellent bonding after the high-temperature processes. Because of this, the adhesive composition is significantly excellent in heat resistance.

The adhesive composition of the present invention can also be suitably used in bonding of workpieces (such as layers to be processed by heating, pressurization, and lithography) that include a polymer containing a polyether structure.

MODES FOR CARRYING OUT THE INVENTION

The present invention provides an adhesive composition including a polymer that contains a unit structure of Formula (1) and contains, at a terminal or in a side chain or the main chain, at least one group containing a structure of Formula (2-A), a structure of Formula (2-B), or both structures.

The adhesive composition may include a solvent in addition to the polymer, and can further include an optional component such as an additional resin for enhancing the performance of an adhesive, a tackifier, a plasticizer, an adhesive aid, a stabilizer, a colorant, and a surfactant.

The solid content of the adhesive composition of the present invention, which is the proportion of the material left after removing solvent from the adhesive composition, is 0.1 to 80% by mass and is preferably 1 to 60% by mass. The proportion, in the solid matter, of the polymer that contains the unit structure of Formula (1) can be 30 to 100% by mass and can be preferably 50 to 100% by mass.

The polymer used in the present invention is preferably a thermosetting resin.

The structure of Formula (2-A) is a carbon-carbon triple bond, while the structure of Formula (2-B) is a carbon-carbon double bond. When these structures exist at a terminal or in a side chain of the polymer, they are either of the following monovalent groups:

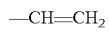

In the main chain of the polymer, they are either a divalent group of Formula (2-A) or a tetravalent group of Formula (2-B).

The carbon-carbon triple bond at a terminal or in a side chain or the main chain of the polymer is, when heated (at 400° C. or higher, for example), assumed to form crosslinking between polymer molecules by forming successive unsaturated bonds (a diene structure, for example) or an aromatic ring structure.

The carbon-carbon double bond is also assumed to form a crosslinked structure when heated.

The molecular weight of the polymer that contains the unit structure of Formula (1) used in the present invention is 500 to 5,000,000, is preferably 1,000 to 1,000,000, and is preferably 1,000 to 100,000 in terms of weight average molecular weight.

The structure of the polymer that contains the unit structure of Formula (1) used in the present invention is described below in detail.

In Formula (1), $L^1$ is an arylene group or a combination of an arylene group and a sulfonyl group or a carbonyl group.

In Formula (1), $T^1$ is a fluoroalkylene group, a cyclic alkylene group, an arylene group having a substituent, or a combination of an arylene group optionally having a substituent and a fluoroalkylene group or a cyclic alkylene group.

The arylene group having a substituent will be described below.

The combination of an arylene group optionally having a substituent and a fluoroalkylene group or a cyclic alkylene group is a combination of a substituted or unsubstituted arylene group and a fluoroalkylene group or a cyclic alkylene group.

Examples of the arylene group in $L^1$ and $T^1$ include a phenylene group, a naphthyl group, and an anthryl group. Among these, a phenylene group or a naphthyl group can be preferably used.

Examples of the fluoroalkylene group include $C_{1-10}$ fluoroalkylene groups, which can be completely fluorinated (perfluorinated) groups or partly fluorinated (monofluorinated, difluorinated, for example) alkylene groups. Specific examples thereof include a fluoromethylene group, a fluoroethylene group, a fluoro-n-propylene group, a fluoroisopropylene group, a fluoropropane-2,2-diyl group, a fluoro-n-butylene group, a fluoroisobutylene group, a fluoro-sec-butylene group, a fluoro-tert-butylene group, and particularly $C_{1-4}$ fluoroalkylene groups such as a perfluoropropane-2,2-diyl group.

Examples of the cyclic alkylene group include $C_{3-30}$ cyclic alkylene groups such as a cyclopropylene group, a cyclobutylene group, a cyclohexylene group, a 1-methyl-cyclopentylene group, a 2-methyl-cyclopentylene group, a 3-methyl-cyclopentylene group, a 1-ethyl-cyclobutylene group, a 2-ethyl-cyclobutylene group, a 3-ethyl-cyclobutylene group, a 1,2-dimethyl-cyclobutylene group, a 1,3-dimethyl-cyclobutylene group, a 2,2-dimethyl-cyclobutylene group, a 2,3-dimethyl-cyclobutylene group, a 2,4-dimethyl-cyclobutylene group, a 3,3-dimethyl-cyclobutylene group, a 1-n-propyl-cyclopropylene group, a 2-n-propyl-cyclopropylene group, a 1-isopropyl-cyclopropylene group, a 2-isopropyl-cyclopropylene group, a 1,2,2-trimethyl-cyclopropylene group, a 1,2,3-trimethyl-cyclopropylene group, a 2,2,3-trimethyl-cyclopropylene group, a 1-ethyl-2-methyl-cyclopropylene group, a 2-ethyl-1-methyl-cyclopropylene group, a 2-ethyl-2-methyl-cyclopropylene group, and a 2-ethyl-3-methyl-cyclopropylene group. A divalent organic group that is derived from adamantane or norbornene can also be used.

As each of $L^1$ and $T^1$ in the polymer that contains the unit structure of Formula (1) used in the present invention, the functional groups exemplified above, alone or as a combination of a plurality of these, can be used.

The polymer can be a homopolymer containing a single repeating unit structure or a copolymer containing two or more kinds of repeating unit structures.

The adhesive composition of the present invention may include a polymer that contains the unit structure of Formula (1) in which $L^1$ is a divalent group of Formula (3) or a divalent group of Formula (4).

That is, a polymer that contains the unit structure of Formula (1) in which $L^1$ is the divalent group of Formula (3), a polymer that contains the unit structure of Formula (1) in which $L^1$ is the divalent group of Formula (4), or a polymer that contains a combination of these unit structures can be included.

In Formulae (3) and (4), $R^1$, $R^2$, and $R^3$ are independently a $C_{1-10}$ alkyl group, a $C_{1-4}$ fluoroalkyl group, a hydroxy group, an allyl group, an allyloxy group, an amino group, a cyano group, a nitro group, an acyl group, an acyloxy group, a carboxy group, a group containing a tertiary-carbon structure, a cyclic alkyl group, or a combination of these, $L^2$ is a sulfonyl group, a carbonyl group, an ester group, an amido group, a sulfinyl group, or a sulfonamido group, and each of n1, n2, and n3 is an integer of 0 to 4.

Examples of the $C_{1-10}$ alkyl group include a methyl group, an ethyl group, an n-propyl group, an isopropyl group, an n-butyl group, an isobutyl group, a sec-butyl group, a tert-butyl group, an n-pentyl group, a 1-methyl-n-butyl group, a 2-methyl-n-butyl group, a 3-methyl-n-butyl group, a 1,1-dimethyl-n-propyl group, a 1,2-dimethyl-n-propyl group, a 2,2-dimethyl-n-propyl group, a 1-ethyl-n-propyl group, an n-hexyl group, a 1-methyl-n-pentyl group, a 2-methyl-n-pentyl group, a 3-methyl-n-pentyl group, a 4-methyl-n-pentyl group, a 1,1-dimethyl-n-butyl group, a 1,2-dimethyl-n-butyl group, a 1,3-dimethyl-n-butyl group, a 2,2-dimethyl-n-butyl group, a 2,3-dimethyl-n-butyl group, a 3,3-dimethyl-n-butyl group, a 1-ethyl-n-butyl group, a 2-ethyl-n-butyl group, a 1,1,2-trimethyl-n-propyl group, a 1,2,2-trimethyl-n-propyl group, a 1-ethyl-1-methyl-n-propyl group, and a 1-ethyl-2-methyl-n-propyl group.

As the $C_{1-4}$ fluoroalkyl group, a completely fluorinated (perfluorinated) group or a partly fluorinated (monofluorinated, difluorinated, for example) alkyl group can be used. Examples thereof include a fluoromethyl group, a fluoroethyl group, a fluoro-n-propyl group, a fluoroisopropyl group, a fluoro-n-butyl group, a fluoroisobutyl group, a fluoro-sec-butyl group, and a fluoro-tert-butyl group.

Examples of the acyl group include $C_{2-10}$ acyl groups such as a methylcarbonyl group, an ethylcarbonyl group, an n-propylcarbonyl group, an isopropylcarbonyl group, a cyclopropylcarbonyl group, an n-butylcarbonyl group, an isobutylcarbonyl group, a sec-butylcarbonyl group, a tert-butylcarbonyl group, a cyclobutylcarbonyl group, a 1-methyl-cyclopropylcarbonyl group, a 2-methyl-cyclopropylcarbonyl group, an n-pentylcarbonyl group, a 1-methyl-n-butylcarbonyl group, a 2-methyl-n-butylcarbonyl group, a 3-methyl-n-butylcarbonyl group, a 1,1-dimethyl-n-propylcarbonyl group, a 1,2-dimethyl-n-propylcarbonyl group, a 2,2-dimethyl-n-propylcarbonyl group, a 1-ethyl-n-propylcarbonyl group, a cyclopentylcarbonyl group, a 1-methyl-cyclobutylcarbonyl group, a 2-methyl-cyclobutylcarbonyl group, a 3-methyl-cyclobutylcarbonyl group, a 1,2-dimethyl-cyclopropylcarbonyl group, a 2,3-dimethyl-cyclopropylcarbonyl group, a 1-ethyl-cyclopropylcarbonyl group, a 2-ethyl-cyclopropylcarbonyl group, an n-hexylcarbonyl group, a 1-methyl-n-pentylcarbonyl group, a 2-methyl-n-pentylcarbonyl group, a 3-methyl-n-pentylcarbonyl group, a 4-methyl-n-pentylcarbonyl group, a 1,1-dimethyl-n-butylcarbonyl group, a 1,2-dimethyl-n-butylcarbonyl group, a 1,3-dimethyl-n-butylcarbonyl group, a 2,2-dimethyl-n-butylcarbonyl group, a 2,3-dimethyl-n-butylcarbonyl group, a 3,3-dimethyl-n-butylcarbonyl group, a 1-ethyl-n-butylcarbonyl group, a 2-ethyl-n-butylcarbonyl group, and a 1,1,2-trimethyl-n-propylcarbonyl group.

Examples of the acyloxy group include $C_{2-10}$ acyloxy groups such as a methylcarbonyloxy group, an ethylcarbonyloxy group, an n-propylcarbonyloxy group, an isopropylcarbonyloxy group, a cyclopropylcarbonyloxy group, an n-butylcarbonyloxy group, an isobutylcarbonyloxy group, a sec-butylcarbonyloxy group, a tert-butylcarbonyloxy group, a cyclobutylcarbonyloxy group, a 1-methyl-cyclopropylcarbonyloxy group, a 2-methyl-cyclopropylcarbonyloxy group, an n-pentylcarbonyloxy group, a 1-methyl-n-butylcarbonyloxy group, a 2-methyl-n-butylcarbonyloxy group, a 3-methyl-n-butylcarbonyloxy group, a 1,1-dimethyl-n-propylcarbonyloxy group, a 1,2-dimethyl-n-propylcarbonyloxy group, a 2,2-dimethyl-n-propylcarbonyloxy group, a 1-ethyl-n-propylcarbonyloxy group, a cyclopentylcarbonyloxy group, a 1-methyl-cyclobutylcarbonyloxy group, a 2-methyl-cyclobutylcarbonyloxy group, a 3-methyl-cyclobutylcarbonyloxy group, a 1,2-dimethyl-cyclopropylcarbonyloxy group, a 2,3-dimethyl-cyclopropylcarbonyloxy group, a 1-ethyl-cyclopropylcarbonyloxy group, a 2-ethyl-cyclopropylcarbonyloxy group, an n-hexylcarbonyloxy group, a 1-methyl-n-pentylcarbonyloxy group, a 2-methyl-n-pentylcarbonyloxy group, a 3-methyl-n-pentylcarbonyloxy group, a 4-methyl-n-pentylcarbonyloxy group, a 1,1-dimethyl-n-butylcarbonyloxy group, a 1,2-dimethyl-n-butylcarbonyloxy group, a 1,3-dimethyl-n-butylcarbonyloxy group, a 2,2-dimethyl-n-butylcarbonyloxy group, a 2,3-dimethyl-n-butylcarbonyloxy group, a 3,3-dimethyl-n-butylcarbonyloxy group, a 1-ethyl-n-butylcarbonyloxy group, a 2-ethyl-n-butylcarbonyloxy group, and a 1,1,2-trimethyl-n-propylcarbonyloxy group.

As the group containing a tertiary-carbon structure, a tertiary butyl group can be preferably used.

Examples of the cyclic alkyl group include $C_{3-30}$ cyclic alkyl groups such as a cyclopropyl group, a cyclobutyl group, a cyclohexyl group, a 1-methyl-cyclopentyl group, a 2-methyl-cyclopentyl group, a 3-methyl-cyclopentyl group, a 1-ethyl-cyclobutyl group, a 2-ethyl-cyclobutyl group, a 3-ethyl-cyclobutyl group, a 1,2-dimethyl-cyclobutyl group, a 1,3-dimethyl-cyclobutyl group, a 2,2-dimethyl-cyclobutyl group, a 2,3-dimethyl-cyclobutyl group, a 2,4-dimethyl-cyclobutyl group, a 3,3-dimethyl-cyclobutyl group, a 1-n-propyl-cyclopropyl group, a 2-n-propyl-cyclopropyl group, a 1-isopropyl-cyclopropyl group, a 2-isopropyl-cyclopropyl group, a 1,2,2-trimethyl-cyclopropyl group, a 1,2,3-trimethyl-cyclopropyl group, a 2,2,3-trimethyl-cyclopropyl group, a 1-ethyl-2-methyl-cyclopropyl group, a 2-ethyl-1-methyl-cyclopropyl group, a 2-ethyl-2-methyl-cyclopropyl group, and a 2-ethyl-3-methyl-cyclopropyl group. A monovalent organic group that is derived from adamantane or norbornene can also be used.

A preferable structure of Formula (3) can be one in which $R^1$ has a cyano group and n1 is an integer of 1 to 4.

The structure of Formula (4) can be one in which $L^2$ is a sulfonyl group or a carbonyl group.

The polymer that contains the unit structure of Formula (1) used in the present invention can contain, irrespective of the selection of $L^1$ or associated with the selection of $L^1$, a polymer that contains the unit structure of Formula (1) in which $T^1$ is a divalent group of Formula (5), a polymer that contains the unit structure of Formula (1) in which $T^1$ is a divalent group of Formula (6), or a polymer that contains a combination of these unit structures.

That is, the polymer used in the present invention can be a polymer that contains the unit structure of Formula (1) in which $L^1$ is the divalent group of Formula (3); the unit structure of Formula (1) in which $L^1$ is the divalent group of Formula (4); the unit structure of Formula (1) in which $T^1$ is the divalent group of Formula (5); the unit structure of Formula (1) in which $T^1$ is the divalent group of Formula (6); the unit structure of Formula (1) in which $L^1$ is the divalent group of Formula (3) and $T^1$ is the divalent group of Formula (5); the unit structure of Formula (1) in which $L^1$ is the divalent group of Formula (3) and $T^1$ is the divalent group of Formula (6); the unit structure of Formula (1) in which $L^1$ is the divalent group of Formula (4) and $T^1$ is the divalent group of Formula (5); the unit structure of Formula (1) in which $L^1$ is the divalent group of Formula (4) and $T^1$ is the divalent group of Formula (6); or a combination of these unit structures.

In Formulae (5) and (6), each of $R^4$, $R^5$, and $R^6$ is a $C_{1-10}$ alkyl group, a $C_{1-4}$ fluoroalkyl group, a hydroxy group, an allyl group, an allyloxy group, an amino group, a cyano group, a nitro group, an acyl group, an acyloxy group, a carboxy group, a group containing a tertiary-carbon structure, a cyclic alkyl group, or a combination of these, and each of n4, n5, and n6 is an integer of 0 to 4. $T^2$ is a fluoroalkylene group, a cyclic alkylene group, or a combination of these.

As the $C_{1-10}$ alkyl group, the $C_{1-4}$ fluoroalkyl group, the acyl group, the acyloxy group, the group containing a tertiary-carbon structure, and the cyclic alkyl group, those groups exemplified above can be used.

As each of the fluoroalkylene group and the cyclic alkylene group, those groups exemplified above, alone or as a combination, can be used.

As the polymer included in the adhesive composition of the present invention, a copolymer that contains both the unit structure of Formula (1) and the unit structure of Formula (7) can be used.

In Formula (7), $L^3$ is the divalent group of Formula (3) or Formula (4), while $T^3$ is an alkylene group, a sulfonyl group, a carbonyl group, a $C_{6-30}$ arylene group, or a combination of these where the arylene group and the alkylene group can be those groups exemplified above.

Examples of the alkylene group in Formula (7) include $C_{1-10}$ alkylene groups such as a methylene group, an ethylene group, an n-propylene group, an isopropylene group, a propane-2,2-diyl group, an n-butylene group, an isobutylene group, an sec-butylene group, a tert-butylene group, and particularly $C_{1-4}$ alkylene groups such as a propane-2,2-diyl group.

The arylene group in Formula (7) can be a phenylene group or a naphthylene group that is substituted or unsubstituted.

$T^3$ in Formula (7) can be a divalent group of Formula (8). In Formula (8), each of $R^7$ and $R^8$ is a $C_{1-10}$ alkyl group, a $C_{1-4}$ fluoroalkyl group, a hydroxy group, an allyl group, an allyloxy group, an amino group, a cyano group, a nitro group, an acyl group, an acyloxy group, a carboxy group, a group containing a tertiary-carbon structure, a cyclic alkyl group, or a combination of these, each of n7 and n8 is an integer of 0 to 4, and $T^4$ is an alkylene group, a sulfonyl group, a carbonyl group, a $C_{6-30}$ arylene group, or a combination of these.

As the alkyl group, the $C_{1-4}$ fluoroalkyl group, the acyl group, the acyloxy group, the group containing a tertiary-carbon structure, the cyclic alkyl group, the alkylene group, and the arylene group, those exemplified above can be used.

In the present invention, the "group containing a tertiary-carbon structure" means a functional group containing a tertiary-carbon structure, in which the functional group substitutes for a hydrogen atom on a carbon atom to form quaternary carbon. Examples of an organic group bonded to carbon in the tertiary-carbon structure include alkyl groups such as a methyl group, an ethyl group, and a propyl group and aryl groups such as a phenyl group. Among these, a methyl group is preferably used, and therefore, a tertiary butyl group having three methyl groups can be preferably used.

Examples of the polymer used in the adhesive composition of the present invention may include the following polymers of Formulae (1-1) to (1-42):

Formula (1-1)

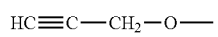
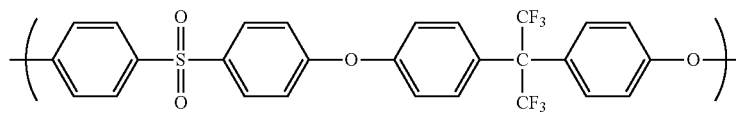

Formula (1-2)

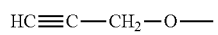
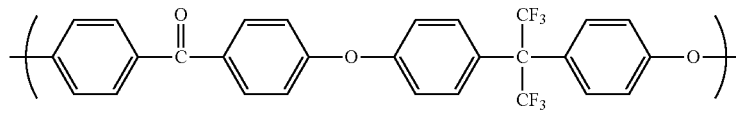

Formula (1-3)

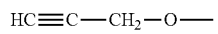
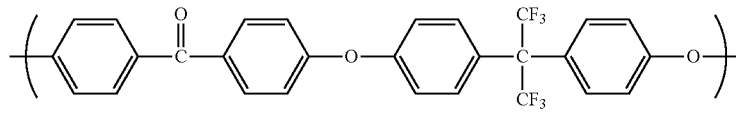

-continued
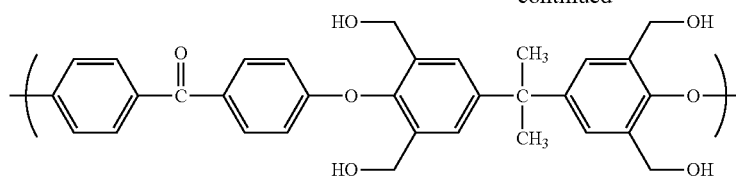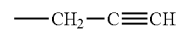
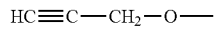
Formula (1-4)
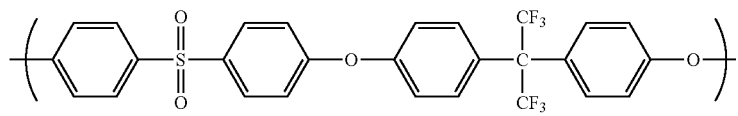
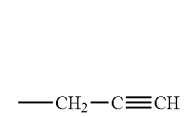
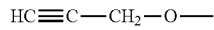
Formula (1-5)
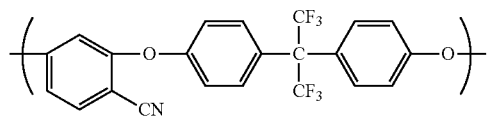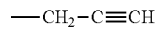
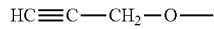
Formula (1-6)
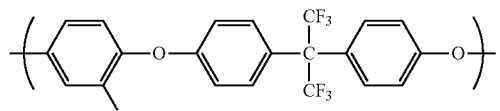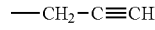
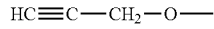
Formula (1-7)
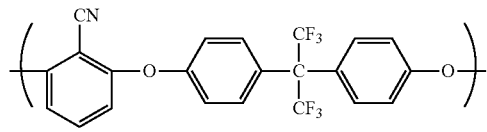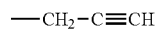
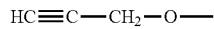
Formula (1-8)
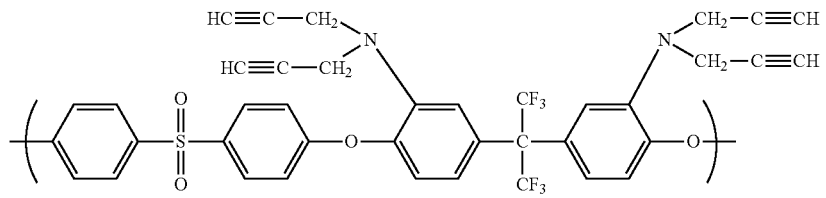
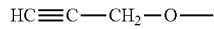
Formula (1-9)
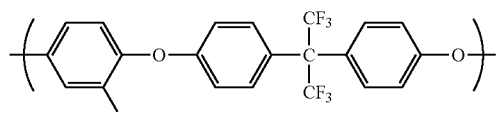
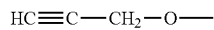
Formula (1-10)
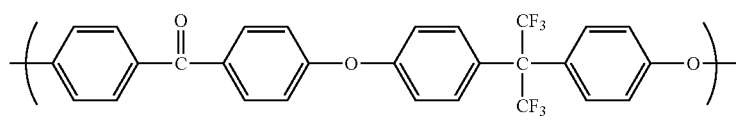

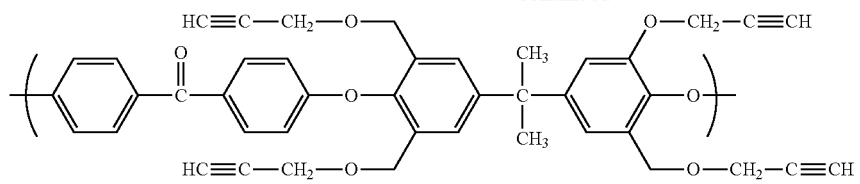
Formula (1-11)
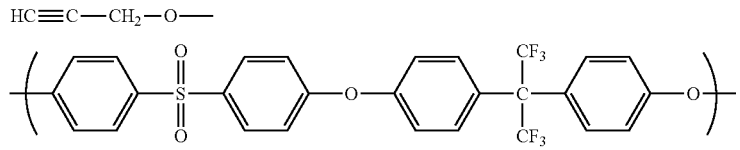
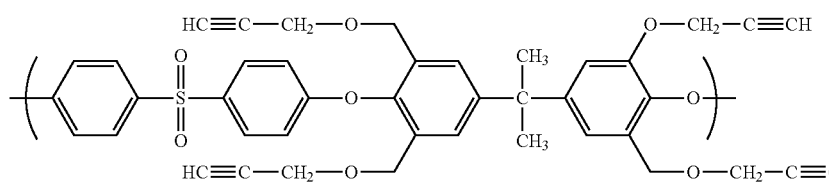
Formula (1-12)
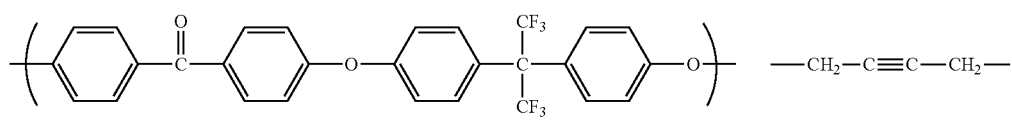
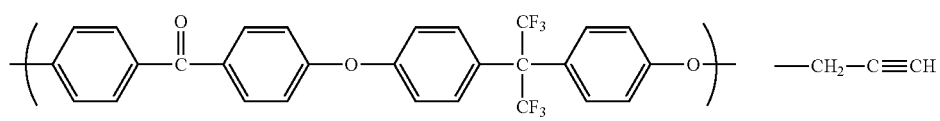
Formula (1-13)
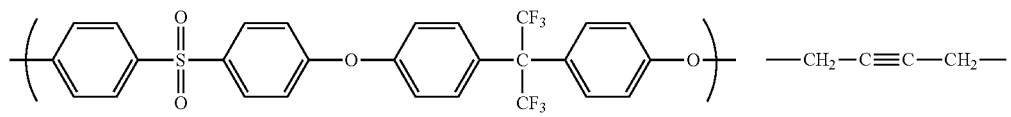
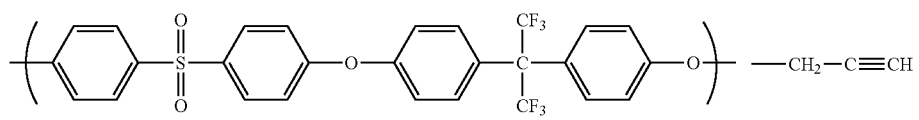
Formula (1-14)
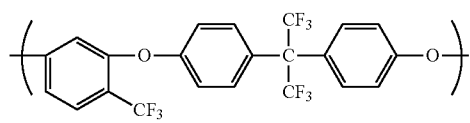 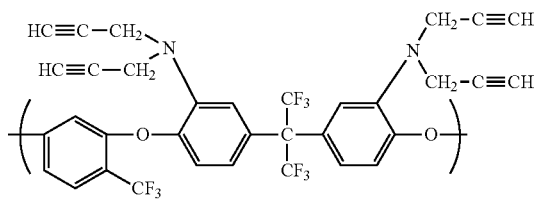
Formula (1-15)
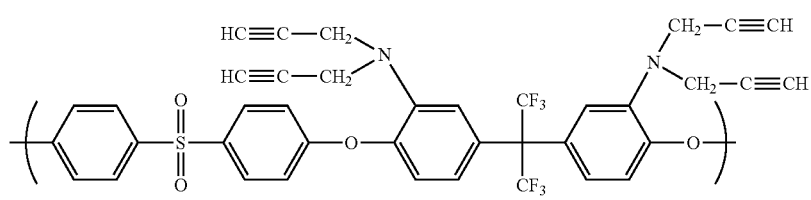

-continued
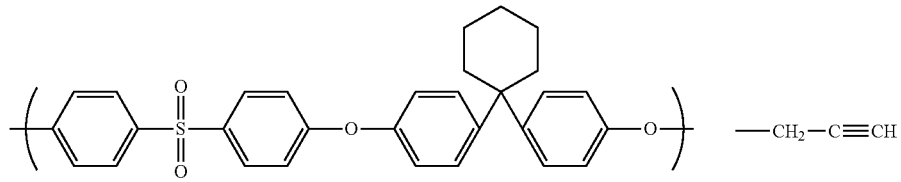
Formula (1-16)
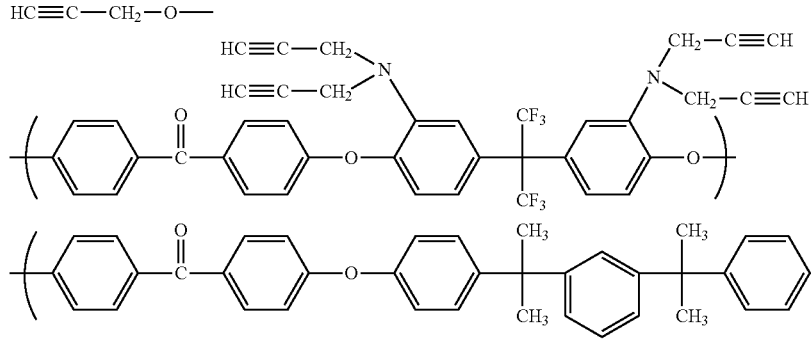
Formula (1-17)
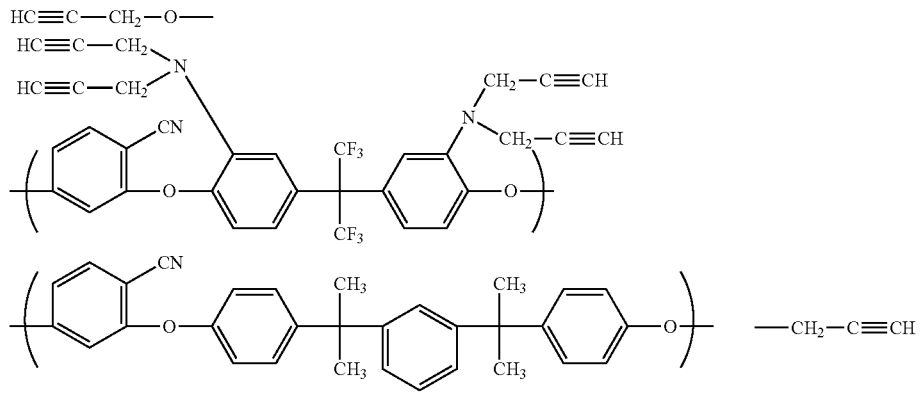
Formula (1-18)
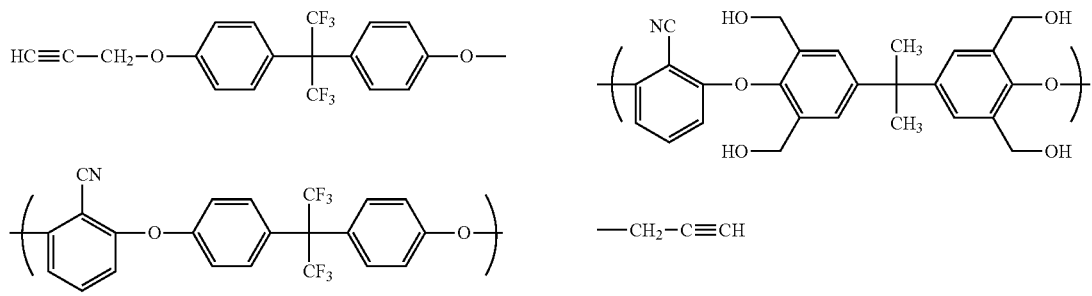
Formula (1-19)
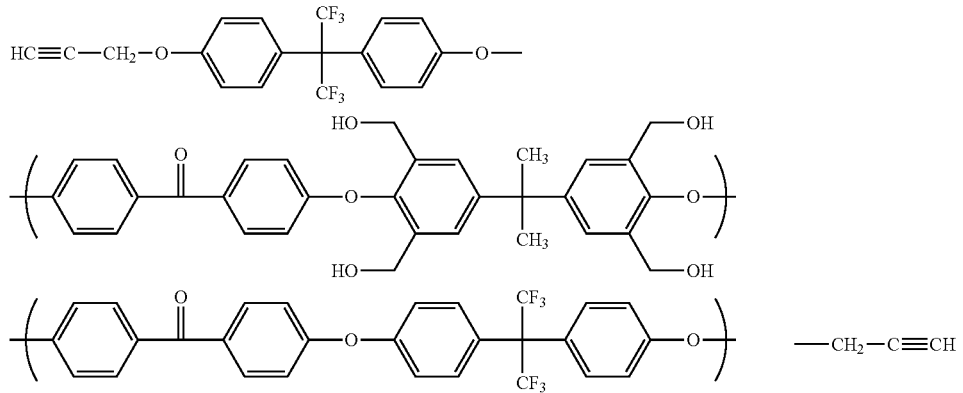

-continued
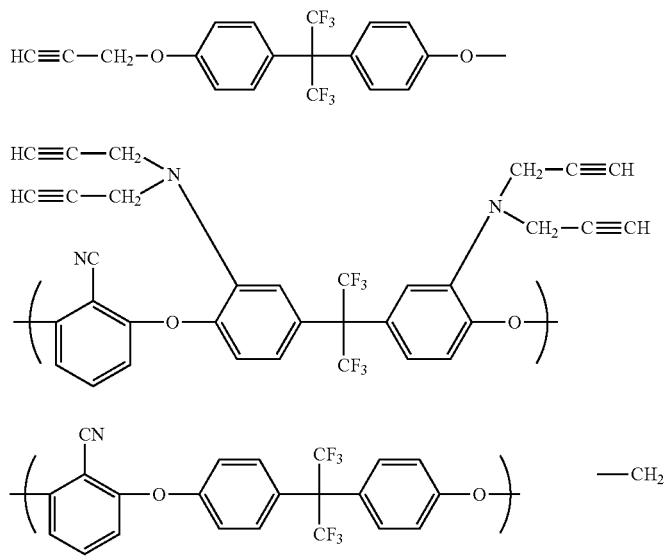
Formula (1-20)
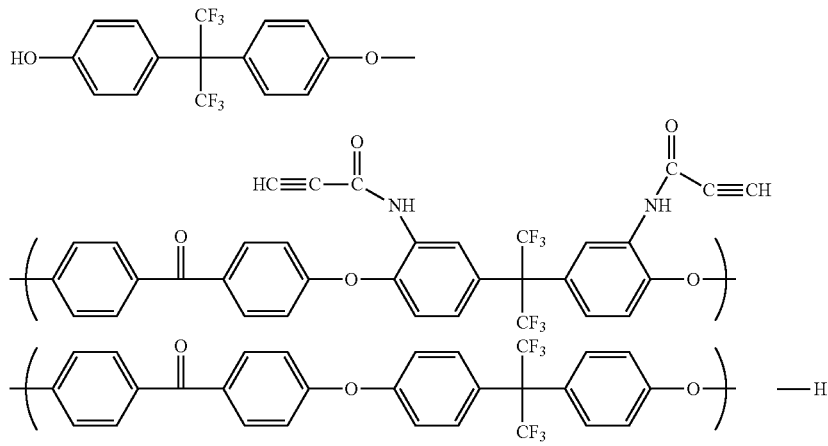
Formula (1-21)
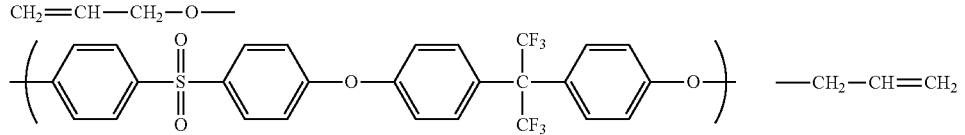
Formula (1-22)
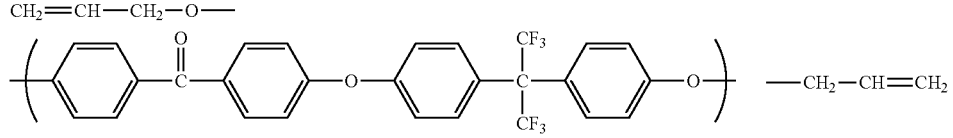
Formula (1-23)
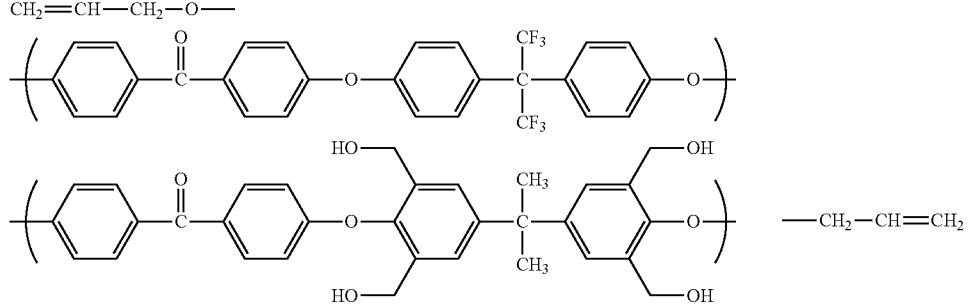
Formula (1-24)

-continued
CH₂=CH—CH₂—O—
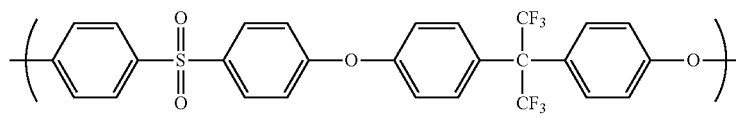
Formula (1-25)
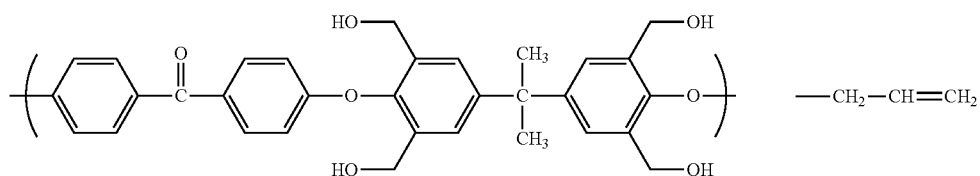 —CH₂—CH=CH₂
Formula (1-26)
CH₂=CH—CH₂—O—
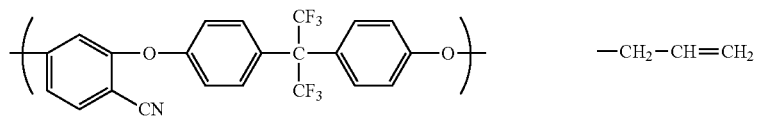 —CH₂—CH=CH₂
Formula (1-27)
CH₂=CH—CH₂—O—
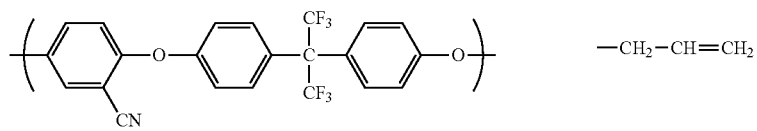 —CH₂—CH=CH₂
Formula (1-28)
CH₂=CH—CH₂—O—
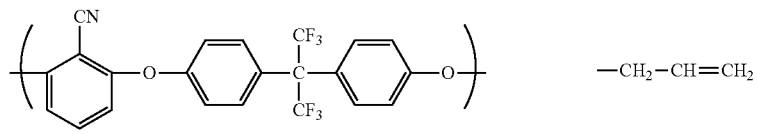 —CH₂—CH=CH₂
Formula (1-29)
CH₂=CH—CH₂—O—
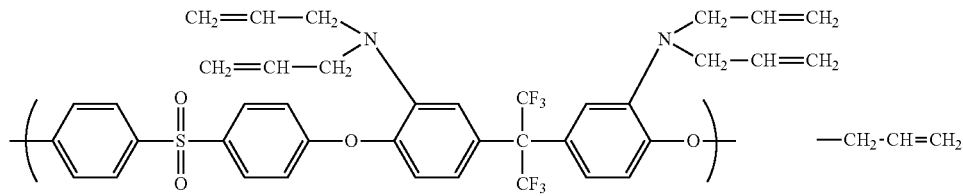 —CH₂-CH=CH₂
Formual (1-30)
CH₂=CH—CH₂—O—
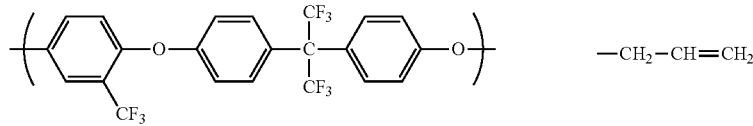 —CH₂—CH=CH₂
Formula (1-31)
CH₂=CH—CH₂—O—
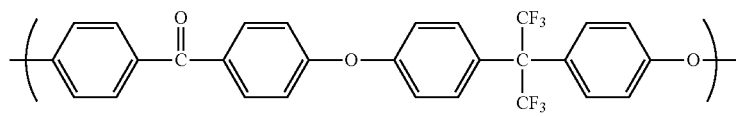

-continued
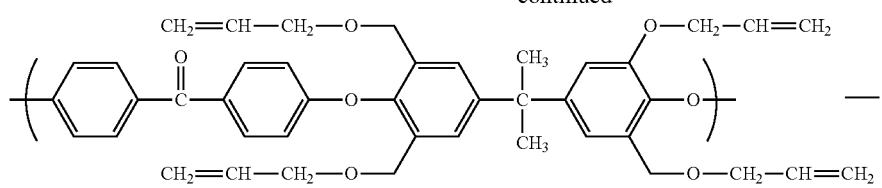
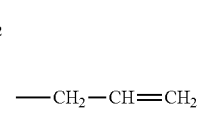
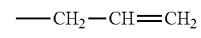
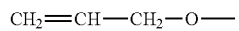
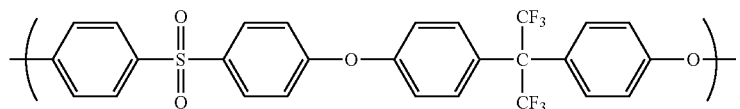
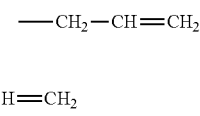
Formula (1-32)
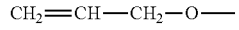
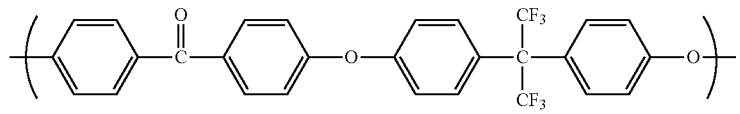
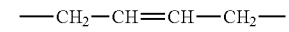
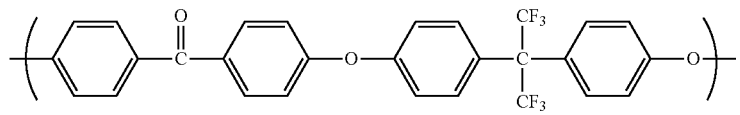
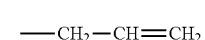
Formula (1-33)
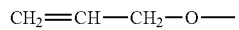
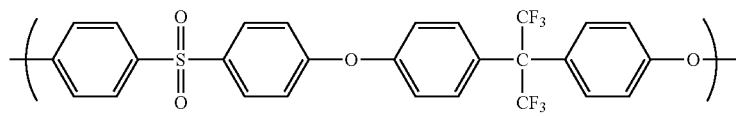
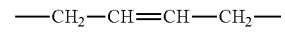
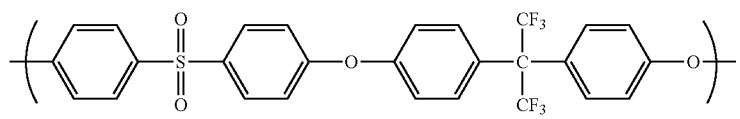
Formula (1-34)
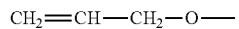
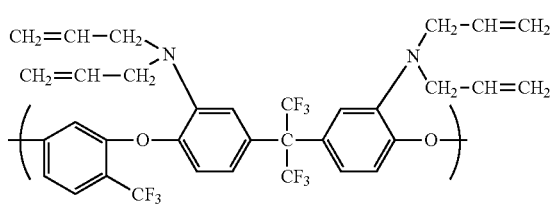
Formula (1-35)
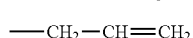
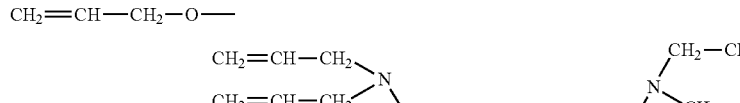
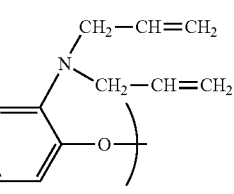
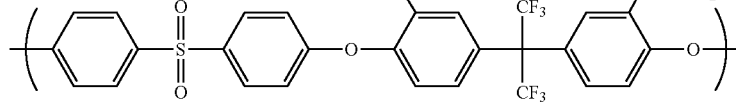
Formula (1-36)

-continued
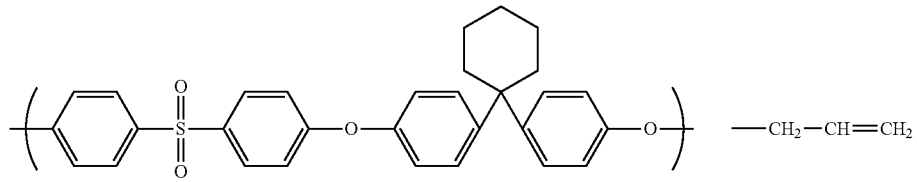
Formula (1-37)
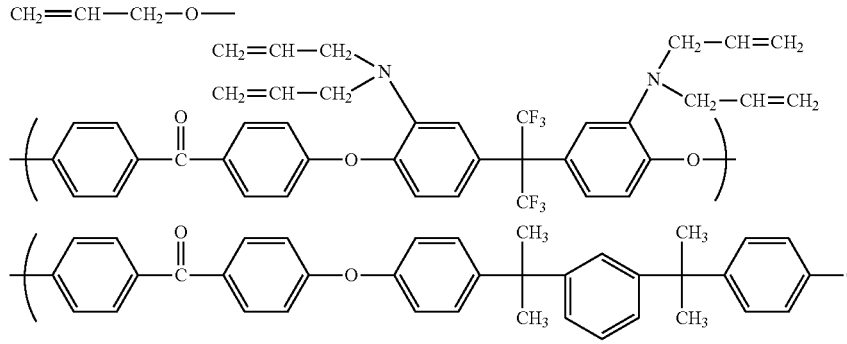
Formula (1-38)
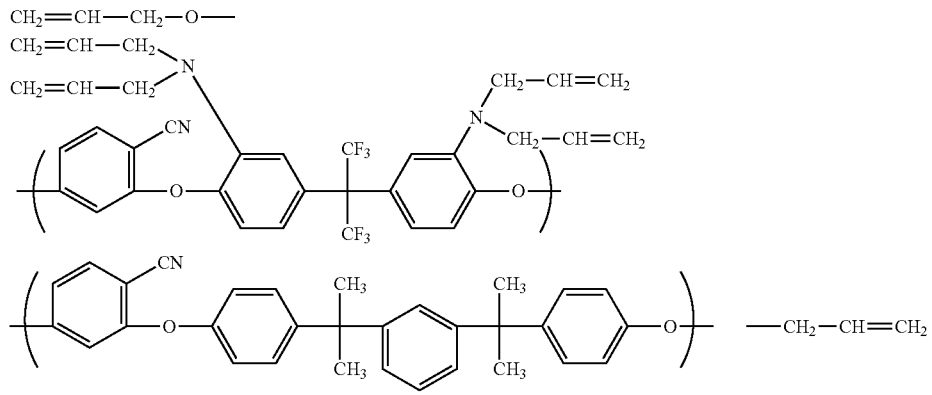
Formula (1-39)
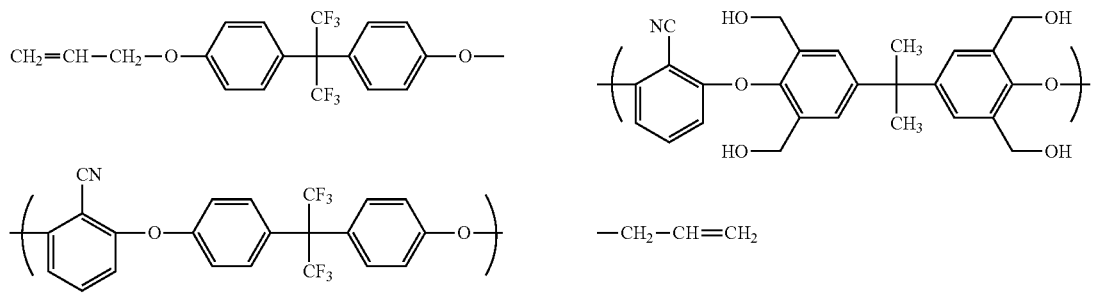
Formula (1-40)
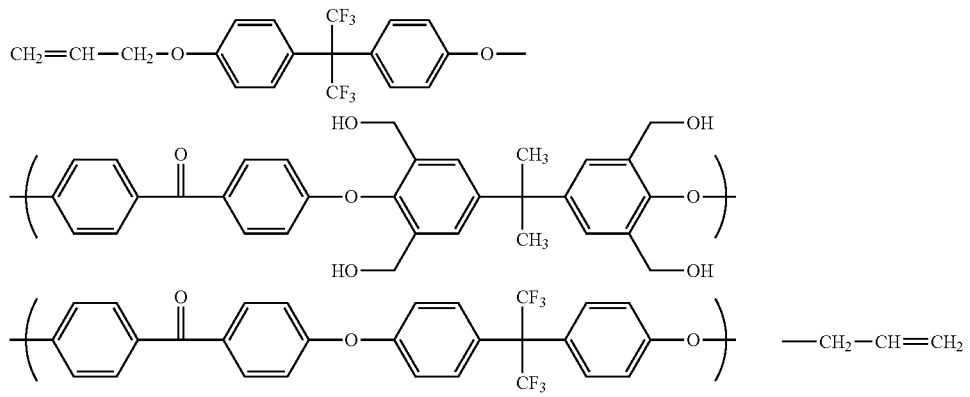

-continued

Formula (1-41)

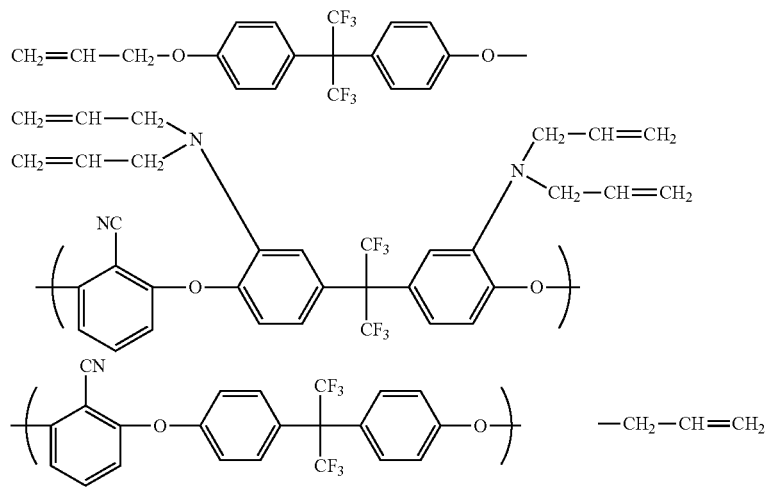

Formula (1-42)

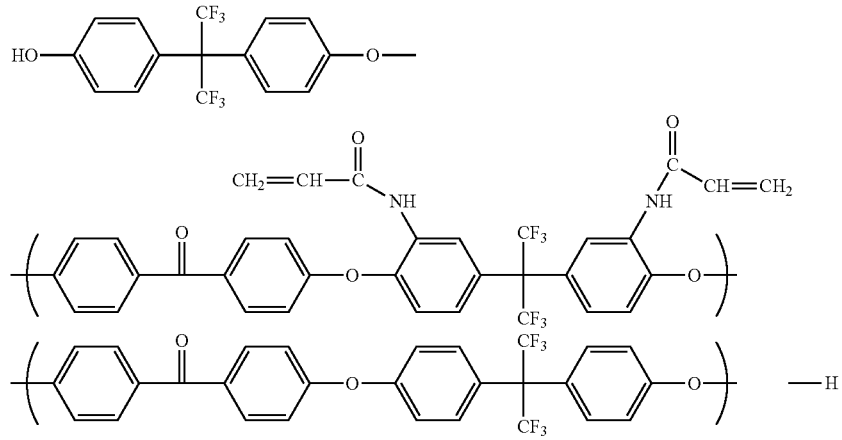

In the synthesis of the polymer that contains the unit structure of Formula (1), a functional group having a hydroxy group can be introduced at the terminal or in a side chain of the polymer during the steps.

The hydroxy group is then subjected to a reaction, which is a dehydrohalogenation reaction, with a monohaloalkyne (the halogen is fluorine, chlorine, bromine, or iodine, for example) or a monohaloalkene (the halogen is fluorine, chlorine, bromine, or iodine, for example) to form a carbon-carbon triple bond (an alkyne) or a carbon-carbon double bond (an alkene) at the terminal or in a side chain.

Alternatively, a polymer containing a hydroxy group at a terminal or in a side chain is subjected to a reaction, which is a dehydrohalogenation reaction, with a dihaloalkyne (the halogen is fluorine, chlorine, bromine, or iodine, for example) or a dihaloalkene (the halogen is fluorine, chlorine, bromine, or iodine, for example) to form a carbon-carbon triple bond (an alkyne) or a carbon-carbon double bond (an alkene) in the main chain of the molecule.

The adhesive composition of the present invention can be a coating mixture containing an organic solvent. The viscosity of a solution of the polymer that contains the unit structure of Formula (1) in the organic solvent is preferably within the range of 0.001 to 5,000 Pa·s, which can make the coating mixture ready for spin coating.

The organic solvent is not particularly limited provided that it is usable in other semiconductor fabrication steps, and is preferably a ketone such as cyclohexanone, methyl isoamyl ketone, and 2-heptanone; a polyhydric alcohol such as monomethyl ether, monoethyl ether, monopropyl ether, monobutyl ether, and monophenyl ether of ethylene glycol, ethylene glycol monoacetate, diethylene glycol, diethylene glycol monoacetate, propylene glycol, propylene glycol monoacetate, dipropylene glycol, or dipropylene glycol monoacetate, or a derivative thereof; a cyclic ether such as dioxanes; or an ester such as methyl lactate, ethyl lactate, methyl acetate, ethyl acetate, butyl acetate, methyl pyruvate, ethyl pyruvate, methyl methoxypropionate, and ethyl ethoxypropionate. These may be used alone or as a mixture of two or more of these.

To the adhesive composition of the embodiment of the present invention, a commonly used, miscible additive such as an additional resin for enhancing the performance of an adhesive, a tackifier, a plasticizer, an adhesive aid, a stabilizer, a colorant, and a surfactant can be further added provided that they do not impair the essential features of the present invention.

As the additional resin (polymer) for enhancing the performance of an adhesive, an addition polymer or a condensation polymer such as polyesters, polystyrene, polyimides, acrylic polymers, methacryl polymers, poly(vinyl ether), phenol novolac, naphthol novolac, polyethers, polyamides, and polycarbonates can be used, and a polymer containing an aromatic ring structure such as a benzene ring, a naphthalene ring, an anthracene ring, a triazine ring, a quinoline ring, and a quinoxaline ring is preferably used.

Examples of the additional resin (polymer) include addition polymers that contain, as a structural unit, an addition-polymerizable monomer such as benzyl acrylate, benzyl methacrylate, phenyl acrylate, naphthyl acrylate, anthryl methacrylate, anthrylmethyl methacrylate, styrene, hydroxystyrene, benzyl vinyl ether, and N-phenylmaleimide, and condensation polymers such as phenol novolac and naphthol novolac.

As the additional resin (polymer), a polymer containing no aromatic ring structure can also be used. Examples of the polymer include addition polymers that contain, as the only structural unit, an addition-polymerizable monomer containing no aromatic ring structure such as alkyl acrylates, alkyl methacrylates, vinyl ethers, alkyl vinyl ethers, acrylonitrile, maleimide, N-alkylmaleimide, and maleic anhydrides.

The addition polymer used as the additional resin (polymer) may be a homopolymer or a copolymer. The addition polymer is produced using an addition-polymerizable monomer. Examples of the addition-polymerizable monomer include acrylic acid, methacrylic acid, acrylic acid ester compounds, methacrylic acid ester compounds, acrylamide compounds, methacrylamide compounds, vinyl compounds, styrene compounds, maleimide compounds, maleic anhydrides, and acrylonitrile.

Examples of the acrylic acid ester compounds include methyl acrylate, ethyl acrylate, normal hexyl acrylate, isopropyl acrylate, cyclohexyl acrylate, benzyl acrylate, phenyl acrylate, anthrylmethyl acrylate, 2-hydroxyethyl acrylate, 3-chloro-2-hydroxypropyl acrylate, 2-hydroxypropyl acrylate, 2,2,2-trifluoroethyl acrylate, 2,2,2-trichloroethyl acrylate, 2-bromoethyl acrylate, 4-hydroxybutyl acrylate, 2-methoxyethyl acrylate, tetrahydrofurfuryl acrylate, 2-methyl-2-adamantyl acrylate, 5-acryloyloxy-6-hydroxynorbornene-2-carboxylic-6-lactone, 3-acryloxypropyltriethoxysilane, and glycidyl acrylate.

Examples of the methacrylic acid ester compounds include methyl methacrylate, ethyl methacrylate, normal hexyl methacrylate, isopropyl methacrylate, cyclohexyl methacrylate, benzyl methacrylate, phenyl methacrylate, anthrylmethyl methacrylate, 2-hydroxyethyl methacrylate, 2-hydroxypropyl methacrylate, 2,2,2-trifluoroethyl methacrylate, 2,2,2-trichloroethyl methacrylate, 2-bromoethyl methacrylate, 4-hydroxybutyl methacrylate, 2-methoxyethyl methacrylate, tetrahydrofurfuryl methacrylate, 2-methyl-2-adamantyl methacrylate, 5-methacryloyloxy-6-hydroxynorbornene-2-carboxylic-6-lactone, 3-methacryloxypropyltriethoxysilane, glycidyl methacrylate, 2-phenylethyl methacrylate, hydroxyphenyl methacrylate, and bromophenyl methacrylate.

Examples of the acrylamide compounds include acrylamide, N-methylacrylamide, N-ethylacrylamide, N-benzylacrylamide, N-phenylacrylamide, N,N-dimethylacrylamide, and N-anthrylacrylamide.

Examples of the methacrylamide compounds include methacrylamide, N-methylmethacrylamide, N-ethylmethacrylamide, N-benzylmethacrylamide, N-phenylmethacrylamide, N,N-dimethylmethacrylamide, and N-anthrylacrylamide.

Examples of the vinyl compounds include vinyl alcohol, 2-hydroxyethyl vinyl ether, methyl vinyl ether, ethyl vinyl ether, benzyl vinyl ether, vinylacetic acid, vinyltrimethoxysilane, 2-chloroethyl vinyl ether, 2-methoxyethyl vinyl ether, vinylnaphthalene, and vinylanthracene.

Examples of the styrene compounds include styrene, hydroxystyrene, chlorostyrene, bromostyrene, methoxystyrene, cyanostyrene, and acetylstyrene.

Examples of the maleimide compounds include maleimide, N-methylmaleimide, N-phenylmaleimide, N-cyclohexylmaleimide, N-benzylmaleimide, and N-hydroxyethylmaleimide.

The molecular weight of the additional resin (polymer) used in the adhesive composition of the present invention is, for example, 1,000 to 1,000,000, 3,000 to 300,000, 5,000 to 200,000, or 10,000 to 100,000 in terms of weight average molecular weight.

When the additional resin (polymer) is included in the adhesive composition of the present invention, the content thereof in the solid matter is, for example, 0 to 40% by mass, 0 to 20% by mass, or 1 to 19% by mass.

The tackifier is added so as to control the modulus of elasticity, the viscosity, and the surface state. The tackifier is preferably selected in consideration of the viscosity, and specific examples thereof include aliphatic petroleum resins, aromatic petroleum resins, aliphatic/aromatic-copolymer petroleum resins, alicyclic hydrogenated petroleum resins, alkyl phenolic resins, xylene resins, coumarone-indene resins, terpene resins, terpene phenolic resins, aromatic-modified terpene resins, hydrogenated terpene resins, rosin resins, hydrogenated rosin resins, disproportionated rosin resins, dimerized rosin resins, and esterified rosin resins, which are used alone or as a combination of two or more of these. The content of the tackifier can be 0 to 100 parts by mass relative to 100 parts by mass of the main component of the adhesive composition, which is polyether. When the amount of the tackifier exceeds 100 parts by mass, heat resistance may become inadequate.

Therefore, the amount of the tackifier is more preferably within the range of 0 to 100 parts by mass and is further preferably within the range of 0 to 50 parts by mass.

In the present invention, the adhesive composition of the present invention is applied by spin coating to a material to be bonded such as a substrate, followed by baking at 50 to 300° C. to form an adhesive layer, onto which another material to be bonded that is of the same kind as or of a different kind from the preceding material is applied to achieve bonding, thereby obtaining a laminate that includes layers of the material being bonded and the adhesive layer interposed between the layers of the material being bonded. The layers of the material being bonded in the laminate may be subjected to processing.

As described above, for spin coating, the adhesive composition of the present invention that includes an organic solvent can be suitably used.

As the material to be bonded to which the adhesive composition of the present invention can be used to form a laminate, an inorganic material such as silicon, silicon oxide, glass, and silicon nitride, a metal material such as aluminum and copper, or a resin material such as polyamide resins, polyimide resins, epoxy resins, polyacrylic resins, polymethacrylic resins, polybenzoxazole resins, polyhydroxystyrene resins, and benzocyclobutene resins is used, for example.

As a support to which the adhesive composition of the present invention can be used, silicon substrates, glass substrates, resin substrates, and ceramic substrates are exemplified.

In the present invention, when the adhesive composition (as a coating mixture) is applied to the material to be bonded (substrate, for example) by spin coating or a similar method, the thickness of the adhesive layer formed is preferably not smaller than 0.1 µm and not greater than 200 µm.

When the adhesive layer is used in a semiconductor wafer or the like and the adhesive layer formed on a material being bonded is too thin, the adhesive layer cannot follow the surface asperities at the time of bonding, resulting in a possible occurrence of a void, while when too thick, the adhesive layer can have a crack. A preferable thickness of the adhesive layer is desirably 1 µm to 50 µm.

EXAMPLES

The present invention will be described more specifically by Examples and Comparative Examples. The scope of the present invention is, however, not limited to these.

GPC analysis of polymer compounds to be obtained in Synthesis Examples below is carried out by using the following devices under the following measurement conditions.

Device: an integrated high-performance GPC system HLC-8220 GPC manufactured by Tosoh Corporation
Column: KF-G, KF804 L
Column temperature: 40° C.
Solvent: THF
Flow rate: 1.0 mL/minute
Standard sample: polystyrene
Detector: RI

Synthesis Example 1

In a three-necked flask equipped with a stirrer, a thermometer, and a Dimroth condenser, 54.56 g of 4,4'-dichlorodiphenyl sulfone and 67.25 g of 2,2-bis(4-hydroxyphenyl)hexafluoropropane were dissolved in 753.46 g of 1-methyl-2-pyrrolidone, to which 28.88 g of potassium carbonate was added, followed by subjecting the system to replacement with nitrogen.

The resultant was subjected to a reaction in an oil bath at 190° C. for 20 hours.

The reaction solution was subjected to suction filtration by a Kiriyama-rohto funnel, and to the filtrate, a solution of 1N hydrochloric acid:1-methyl-2-pyrrolidone=1:9 was added so as to make the resultant acidic, which was confirmed using a strip of litmus paper. Subsequently, the resulting solution was added dropwise to a mixture of water:methanol=1:9 for reprecipitation. After dropwise addition, the resultant was subjected to suction filtration by a Buchner funnel and was washed with methanol three times, water twice, and methanol three times in this order, followed by drying the resulting powder in a vacuum dryer for 12 hours.

10 g of the resulting powder was dissolved in 100 g of tetrahydrofuran, to which 2.16 g of potassium carbonate and 1.69 g of propargyl bromide were added, followed by allowing a reaction to proceed under reflux for 20 hours. The resulting reaction solution was subjected to suction filtration by a Kiriyama-rohto funnel, and to the resulting solution, a solution of 1N hydrochloric acid:1-methyl-2-pyrrolidone=1:9 was added so as to make the resultant acidic, which was confirmed using a strip of litmus paper. Subsequently, the resulting solution was added dropwise to a mixture of water:methanol=1:9 for reprecipitation. After dropwise addition, the resultant was subjected to suction filtration by a Buchner funnel and was washed with methanol three times, water twice, and methanol three times in this order, followed by drying the resulting powder in a vacuum dryer for 12 hours.

GPC analysis of the resulting polymer compound (corresponding to the compound of Formula (1-1)) showed the weight average molecular weight to be 19,000 in terms of standard polystyrene.

Synthesis Example 2

In a three-necked flask equipped with a stirrer, a thermometer, and a Dimroth condenser, 40.37 g of 4,4'-difluorobenzophenone and 69.11 g of 2,2-bis(4-hydroxyphenyl)hexafluoropropane were dissolved in 558.56 g of 1-methyl-2-pyrrolidone, to which 76.71 g of potassium carbonate was added, followed by subjecting the system to replacement with nitrogen.

The resultant was subjected to a reaction in an oil bath at 190° C. for 20 hours.

The reaction solution was subjected to suction filtration by a Kiriyama-rohto funnel, and to the filtrate, a solution of 1N hydrochloric acid:1-methyl-2-pyrrolidone=1:9 was added so as to make the resultant acidic, which was confirmed using a strip of litmus paper. Subsequently, the resulting solution was added dropwise to a mixture of water:methanol=1:9 for reprecipitation. After dropwise addition, the resultant was subjected to suction filtration by a Buchner funnel and was washed with methanol three times, water twice, and methanol three times in this order, followed by drying the resulting powder in a vacuum dryer for 12 hours.

10 g of the resulting powder was dissolved in 100 g of tetrahydrofuran, to which 2.16 g of potassium carbonate and 1.69 g of propargyl bromide were added, followed by allowing a reaction to proceed under reflux for 20 hours. The resulting reaction solution was subjected to suction filtration by a Kiriyama-rohto funnel, and to the resulting solution, a solution of 1N hydrochloric acid:1-methyl-2-pyrrolidone=1:9 was added so as to make the resultant acidic, which was confirmed using a strip of litmus paper. Subsequently, the resulting solution was added dropwise to a mixture of water:methanol=1:9 for reprecipitation. After dropwise addition, the resultant was subjected to suction filtration by a Buchner funnel and was washed with methanol three times, water twice, and methanol three times in this order, followed by drying the resulting powder in a vacuum dryer for 12 hours.

GPC analysis of the resulting polymer compound (corresponding to the compound of Formula (1-2)) showed the weight average molecular weight to be 15,000 in terms of standard polystyrene.

Synthesis Example 3

In a three-necked flask equipped with a stirrer, a thermometer, and a Dimroth condenser, 25.83 g of 4,4'-difluorobenzophenone, 50.43 g of 2,2-bis(4-hydroxyphenyl)hexafluoropropane, and 2.75 g of 2,2'-bis(4-hydroxy-3,5-dihydroxymethylphenyl)propane were dissolved in 504.22 g of 1-methyl-2-pyrrolidone, to which 21.82 g of potassium carbonate was added, followed by subjecting the system to replacement with nitrogen.

The resultant was subjected to a reaction in an oil bath at 160° C. for 20 hours.

The reaction solution was subjected to suction filtration by a Kiriyama-rohto funnel, and to the filtrate, a solution of 1N hydrochloric acid:1-methyl-2-pyrrolidone=1:9 was added so as to make the resultant acidic, which was confirmed using a strip of litmus paper. Subsequently, the resulting solution was added dropwise to a mixture of water:methanol=1:9 for reprecipitation. After dropwise addition, the resultant was subjected to suction filtration by a Buchner funnel and was washed with methanol three times, water twice, and methanol three times in this order, followed by drying the resulting powder in a vacuum dryer for 12 hours.

10 g of the resulting powder was dissolved in 100 g of tetrahydrofuran, to which 2.16 g of potassium carbonate and 1.69 g of propargyl bromide were added, followed by allowing a reaction to proceed under reflux for 20 hours. The resulting reaction solution was subjected to suction filtration by a Kiriyama-rohto funnel, and to the resulting solution, a solution of 1N hydrochloric acid:1-methyl-2-pyrrolidone=1:9 was added so as to make the resultant acidic, which was confirmed using a strip of litmus paper. Subsequently, the resulting solution was added dropwise to a mixture of water:methanol=1:9 for reprecipitation. After dropwise addition, the resultant was subjected to suction filtration by a Buchner funnel and was washed with methanol three times, water twice, and methanol three times in this order, followed by drying the resulting powder in a vacuum dryer for 12 hours.

GPC analysis of the resulting polymer compound (corresponding to the compound of Formula (1-3)) showed the weight average molecular weight to be 22,000 in terms of standard polystyrene.

Synthesis Example 4

In a three-necked flask equipped with a stirrer, a thermometer, and a Dimroth condenser, 43.07 g of 4,4'-dichlorodiphenyl sulfone, 50.43 g of 2,2-bis(4-hydroxyphenyl)hexafluoropropane, and 2.75 g of 2,2'-bis(4-hydroxy-3,5-dihydroxymethylphenyl)propane were dissolved in 590.40 g of 1-methyl-2-pyrrolidone, to which 21.82 g of potassium carbonate was added, followed by subjecting the system to replacement with nitrogen.

The resultant was subjected to a reaction in an oil bath at 160° C. for 20 hours.

The reaction solution was subjected to suction filtration by a Kiriyama-rohto funnel, and to the filtrate, a solution of 1N hydrochloric acid:1-methyl-2-pyrrolidone=1:9 was added so as to make the resultant acidic, which was confirmed using a strip of litmus paper. Subsequently, the resulting solution was added dropwise to a mixture of water:methanol=1:9 for reprecipitation. After dropwise addition, the resultant was subjected to suction filtration by a Buchner funnel and was washed with methanol three times, water twice, and methanol three times in this order, followed by drying the resulting powder in a vacuum dryer for 12 hours.

10 g of the resulting powder was dissolved in 100 g of tetrahydrofuran, to which 2.16 g of potassium carbonate and 1.69 g of propargyl bromide were added, followed by allowing a reaction to proceed under reflux for 20 hours. The resulting reaction solution was subjected to suction filtration by a Kiriyama-rohto funnel, and to the resulting solution, a solution of 1N hydrochloric acid:1-methyl-2-pyrrolidone=1:9 was added so as to make the resultant acidic, which was confirmed using a strip of litmus paper. Subsequently, the resulting solution was added dropwise to a mixture of water:methanol=1:9 for reprecipitation. After dropwise addition, the resultant was subjected to suction filtration by a Buchner funnel and was washed with methanol three times, water twice, and methanol three times in this order, followed by drying the resulting powder in a vacuum dryer for 12 hours.

GPC analysis of the resulting polymer compound (corresponding to the compound of Formula (1-4)) showed the weight average molecular weight to be 26,000 in terms of standard polystyrene.

Synthesis Example 5

In a three-necked flask equipped with a stirrer, a thermometer, and a Dimroth condenser, 10.43 g of 2,4-difluorobenzonitrile and 26.54 g of 2,2-bis(4-hydroxyphenyl)hexafluoropropane were dissolved in 204.22 g of 1-methyl-2-pyrrolidone, to which 31.10 g of potassium carbonate was added, followed by subjecting the system to replacement with nitrogen.

The resultant was subjected to a reaction in an oil bath at 190° C. for 20 hours.

The reaction solution was subjected to suction filtration by a Kiriyama-rohto funnel, and to the filtrate, a solution of 1N hydrochloric acid:1-methyl-2-pyrrolidone=1:9 was added so as to make the resultant acidic, which was confirmed using a strip of litmus paper. Subsequently, the resulting solution was added dropwise to a mixture of water:methanol=1:9 for reprecipitation. After dropwise addition, the resultant was subjected to suction filtration by a Buchner funnel and was washed with methanol three times, water twice, and methanol three times in this order, followed by drying the resulting powder in a vacuum dryer for 12 hours.

10 g of the resulting powder was dissolved in 100 g of tetrahydrofuran, to which 2.16 g of potassium carbonate and 1.69 g of propargyl bromide were added, followed by allowing a reaction to proceed under reflux for 20 hours. The resulting reaction solution was subjected to suction filtration by a Kiriyama-rohto funnel, and to the resulting solution, a solution of 1N hydrochloric acid:1-methyl-2-pyrrolidone=1:9 was added so as to make the resultant acidic, which was confirmed using a strip of litmus paper. Subsequently, the resulting solution was added dropwise to a mixture of water:methanol=1:9 for reprecipitation. After dropwise addition, the resultant was subjected to suction filtration by a Buchner funnel and was washed with methanol three times, water twice, and methanol three times in this order, followed by drying the resulting powder in a vacuum dryer for 12 hours.

GPC analysis of the resulting polymer compound (corresponding to the compound of Formula (1-5)) showed the weight average molecular weight to be 7,000 in terms of standard polystyrene.

Synthesis Example 6

In a three-necked flask equipped with a stirrer, a thermometer, and a Dimroth condenser, 10.76 g of 2,5-difluorobenzonitrile and 26.54 g of 2,2-bis(4-hydroxyphenyl)hexafluoropropane were dissolved in 204.22 g of 1-methyl-2-pyrrolidone, to which 31.10 g of potassium carbonate was added, followed by subjecting the system to replacement with nitrogen.

The resultant was subjected to a reaction in an oil bath at 190° C. for 20 hours.

The reaction solution was subjected to suction filtration by a Kiriyama-rohto funnel, and to the filtrate, a solution of 1N hydrochloric acid:1-methyl-2-pyrrolidone=1:9 was added so as to make the resultant acidic, which was confirmed using a strip of litmus paper. Subsequently, the resulting solution was added dropwise to a mixture of water:methanol=1:9 for reprecipitation. After dropwise addition, the resultant was subjected to suction filtration by a Buchner funnel and was washed with methanol three times, water twice, and methanol three times in this order, followed by drying the resulting powder in a vacuum dryer for 12 hours.

10 g of the resulting powder was dissolved in 100 g of tetrahydrofuran, to which 2.16 g of potassium carbonate and 1.69 g of propargyl bromide were added, followed by allowing a reaction to proceed under reflux for 20 hours. The resulting reaction solution was subjected to suction filtration by a Kiriyama-rohto funnel, and to the resulting solution, a solution of 1N hydrochloric acid:1-methyl-2-pyrrolidone=1:9 was added so as to make the resultant acidic, which was confirmed using a strip of litmus paper. Subsequently, the resulting solution was added dropwise to a mixture of water:methanol=1:9 for reprecipitation. After dropwise addition, the resultant was subjected to suction filtration by a Buchner funnel and was washed with methanol three times, water twice, and methanol three times in this order, followed by drying the resulting powder in a vacuum dryer for 12 hours.

GPC analysis of the resulting polymer compound (corresponding to the compound of Formula (1-6)) showed the weight average molecular weight to be 12,000 in terms of standard polystyrene.

Synthesis Example 7

In a three-necked flask equipped with a stirrer, a thermometer, and a Dimroth condenser, 10.76 g of 2,6-difluorobenzonitrile and 26.54 g of 2,2-bis(4-hydroxyphenyl)hexafluoropropane were dissolved in 204.22 g of 1-methyl-2-pyrrolidone, to which 31.10 g of potassium carbonate was added, followed by subjecting the system to replacement with nitrogen.

The resultant was subjected to a reaction in an oil bath at 190° C. for 20 hours.

The reaction solution was subjected to suction filtration by a Kiriyama-rohto funnel, and to the filtrate, a solution of 1N hydrochloric acid:1-methyl-2-pyrrolidone=1:9 was added so as to make the resultant acidic, which was confirmed using a strip of litmus paper. Subsequently, the resulting solution was added dropwise to a mixture of water:methanol=1:9 for reprecipitation. After dropwise addition, the resultant was subjected to suction filtration by a Buchner funnel and was washed with methanol three times, water twice, and methanol three times in this order, followed by drying the resulting powder in a vacuum dryer for 12 hours.

10 g of the resulting powder was dissolved in 100 g of tetrahydrofuran, to which 2.16 g of potassium carbonate and 1.69 g of propargyl bromide were added, followed by allowing a reaction to proceed under reflux for 20 hours. The resulting reaction solution was subjected to suction filtration by a Kiriyama-rohto funnel, and to the resulting solution, a solution of 1N hydrochloric acid:1-methyl-2-pyrrolidone=1:9 was added so as to make the resultant acidic, which was confirmed using a strip of litmus paper. Subsequently, the resulting solution was added dropwise to a mixture of water:methanol=1:9 for reprecipitation. After dropwise addition, the resultant was subjected to suction filtration by a Buchner funnel and was washed with methanol three times, water twice, and methanol three times in this order, followed by drying the resulting powder in a vacuum dryer for 12 hours.

GPC analysis of the resulting polymer compound (corresponding to the compound of Formula (1-7)) showed the weight average molecular weight to be 11,000 in terms of standard polystyrene.

Synthesis Example 8

In a three-necked flask equipped with a stirrer, a thermometer, and a Dimroth condenser, 25.84 g of 4,4'-dichlorodiphenyl sulfone and 26.54 g of 2,2-bis(3-amino-4-hydroxyphenyl)hexafluoropropane were dissolved in 204.22 g of 1-methyl-2-pyrrolidone, to which 31.10 g of potassium carbonate was added, followed by subjecting the system to replacement with nitrogen.

The resultant was subjected to a reaction in an oil bath at 190° C. for 20 hours.

After the completion of the reaction, cooling was performed until the temperature inside the system reached 80° C., and thereto, 12.44 g of potassium carbonate and 22.54 g of propargyl bromide were added, followed by allowing a reaction to proceed at 80° C. for hours.

After the completion of the reaction, the reaction solution was subjected to suction filtration by a Kiriyama-rohto funnel, and to the filtrate, a solution of 1N hydrochloric acid:1-methyl-2-pyrrolidone=1:9 was added so as to make the resultant acidic, which was confirmed using a strip of litmus paper. Subsequently, the resulting solution was added dropwise to a mixture of water:methanol=1:9 for reprecipitation. After dropwise addition, the resultant was subjected to suction filtration by a Buchner funnel and was washed with methanol three times, water twice, and methanol three times in this order, followed by drying the resulting powder in a vacuum dryer for 12 hours.

GPC analysis of the resulting polymer compound (corresponding to the compound of Formula (1-8)) showed the weight average molecular weight to be 40,000 in terms of standard polystyrene.

Synthesis Example 9

In a three-necked flask equipped with a stirrer, a thermometer, and a Dimroth condenser, 10.21 g of 2,4'-dichlorobenzotrifluoride, 9.16 g of 2,2-bis(3-amino-4-hydroxyphenyl)hexafluoropropane, and 8.41 g of 2,2-bis(4-hydroxyphenyl)hexafluoropropane were dissolved in 204.22 g of 1-methyl-2-pyrrolidone, to which 20.73 g of potassium carbonate was added, followed by subjecting the system to replacement with nitrogen.

The resultant was subjected to a reaction in an oil bath at 190° C. for 20 hours.

After the completion of the reaction, cooling was performed until the temperature inside the system reached 80° C., and thereto, 14.14 g of propargyl bromide was added, followed by allowing a reaction to proceed at 80° C. for 20 hours.

After the completion of the reaction, the reaction solution was subjected to suction filtration by a Kiriyama-rohto funnel, and to the filtrate, a solution of 1N hydrochloric acid:1-methyl-2-pyrrolidone=1:9 was added so as to make the resultant acidic, which was confirmed using a strip of litmus paper. Subsequently, the resulting solution was added dropwise to a mixture of water:methanol=1:9 for reprecipitation. After dropwise addition, the resultant was subjected to suction filtration by a Buchner funnel and was washed with methanol three times, water twice, and methanol three times in this order, followed by drying the resulting powder in a vacuum dryer for 12 hours.

GPC analysis of the resulting polymer compound (corresponding to the compound of Formula (1-14)) showed the weight average molecular weight to be 40,000 in terms of standard polystyrene.

Synthesis Example 10

In a three-necked flask equipped with a stirrer, a thermometer, and a Dimroth condenser, 10.81 g of bis(4-fluorophenyl)sulfone, 9.16 g of 2,2-bis(3-amino-4-hydroxyphenyl)hexafluoropropane, and 6.71 g of 1,1-bis(4-hydroxyphenyl)cyclohexane were dissolved in 80.01 g of 1-methyl-2-pyrrolidone, to which 20.73 g of potassium carbonate was added, followed by subjecting the system to replacement with nitrogen.

The resultant was subjected to a reaction in an oil bath at 160° C. for 20 hours.

After the completion of the reaction, cooling was performed until the temperature inside the system reached 80° C., to which 66.54 g of allyl bromide dissolved in 43.31 g of 1-methyl-2-pyrrolidone and 20.73 g of potassium carbonate were added, followed by stirring at 80° C. for 20 hours to allow a reaction to proceed at a phenolic group and an amino group at a polymer terminal.

After the completion of the reaction, the reaction solution was subjected to suction filtration by a Kiriyama-rohto funnel, and to the filtrate, a solution of 2N hydrochloric acid:1-methyl-2-pyrrolidone=1:9 was added so as to make the resultant acidic, which was confirmed using a strip of litmus paper. Subsequently, the resulting solution was added dropwise to a mixture of water:methanol=1:9 for reprecipitation. After dropwise addition, the resultant was subjected to suction filtration by a Buchner funnel and was washed with methanol three times, water twice, and methanol three times in this order, followed by drying the resulting powder in a vacuum dryer for 12 hours.

GPC analysis of the resulting polymer compound (corresponding to the compound of Formula (1-36)) showed the weight average molecular weight to be 13,400 in terms of standard polystyrene and the reaction rate of the phenolic group and the amino group at the terminal to be 88%.

Synthesis Example 11

In a three-necked flask equipped with a stirrer, a thermometer, and a Dimroth condenser, 37.09 g of 4,4'-difluorobenzophenone, 36.63 g of 2,2-bis(3-amino-4-hydroxyphenyl)hexafluoropropane, and 34.65 g of 1,3-bis[2-(4-hydroxyphenyl)-2-propyl]benzene were dissolved in 325.10 g of 1-methyl-2-pyrrolidone, to which 82.93 g of potassium carbonate was added, followed by subjecting the system to replacement with nitrogen.

The resultant was subjected to a reaction in an oil bath at 160° C. for 20 hours.

After the completion of the reaction, cooling was performed until the temperature inside the system reached 80° C., to which 193.57 g of allyl bromide dissolved in 156.76 g of 1-methyl-2-pyrrolidone and 138.21 g of potassium carbonate were added, followed by stirring at 80° C. for 20 hours to allow a reaction to proceed at a phenolic group and an amino group at a polymer terminal.

After the completion of the reaction, the reaction solution was subjected to suction filtration by a Kiriyama-rohto funnel, and to the filtrate, a solution of 2N hydrochloric acid:1-methyl-2-pyrrolidone=1:9 was added so as to make the resultant acidic, which was confirmed using a strip of litmus paper. Subsequently, the resulting solution was added dropwise to a mixture of water:methanol=1:9 for reprecipitation. After dropwise addition, the resultant was subjected to suction filtration by a Buchner funnel and was washed with methanol three times, water twice, and methanol three times in this order, followed by drying the resulting powder in a vacuum dryer for 12 hours.

GPC analysis of the resulting polymer compound (corresponding to the compound of Formula (1-37)) showed the weight average molecular weight to be 13,900 in terms of standard polystyrene and the reaction rate of the phenolic group and the amino group at the terminal to be 88%.

Synthesis Example 12

In a three-necked flask equipped with a stirrer, a thermometer, and a Dimroth condenser, 9.27 g of 4,4'-difluorobenzophenone, 9.16 g of 2,2-bis(3-amino-4-hydroxyphenyl)hexafluoropropane, and 8.66 g of 1,3-bis[2-(4-hydroxyphenyl)-2-propyl]benzene were dissolved in 81.27 g of 1-methyl-2-pyrrolidone, to which 20.73 g of potassium carbonate was added, followed by subjecting the system to replacement with nitrogen.

The resultant was subjected to a reaction in an oil bath at 160° C. for 20 hours.

After the completion of the reaction, cooling was performed until the temperature inside the system reached 80° C., to which 50.56 g of propargyl bromide dissolved in 39.73 g of 1-methyl-2-pyrrolidone and 20.73 g of potassium carbonate were added, followed by stirring at 80° C. for 20 hours to allow a reaction to proceed at a phenolic group and an amino group at a polymer terminal.

After the completion of the reaction, the reaction solution was subjected to suction filtration by a Kiriyama-rohto funnel, and to the filtrate, a solution of 2N hydrochloric acid:1-methyl-2-pyrrolidone=1:9 was added so as to make the resultant acidic, which was confirmed using a strip of litmus paper. Subsequently, the resulting solution was added dropwise to a mixture of water:methanol=1:9 for reprecipitation. After dropwise addition, the resultant was subjected to suction filtration by a Buchner funnel and was washed with methanol three times, water twice, and methanol three times in this order, followed by drying the resulting powder in a vacuum dryer for 12 hours.

GPC analysis of the resulting polymer compound (corresponding to the compound of Formula (1-16)) showed the weight average molecular weight to be 14,700 in terms of standard polystyrene and the reaction rate of the phenolic group and the amino group at the terminal to be 86%.

Synthesis Example 13

In a three-necked flask equipped with a stirrer, a thermometer, and a Dimroth condenser, 9.27 g of 4,4'-difluorobenzophenone, 9.16 g of 2,2-bis(3-amino-4-hydroxyphenyl)hexafluoropropane, and 8.66 g of 1,3-bis[2-(4-hydroxyphenyl)-2-propyl]benzene were dissolved in 81.27 g of 1-methyl-2-pyrrolidone, to which 20.73 g of potassium carbonate was added, followed by subjecting the system to replacement with nitrogen.

The resultant was subjected to a reaction in an oil bath at 160° C. for 20 hours.

After the completion of the reaction, cooling was performed until the temperature inside the system reached 80° C., to which 12.64 g of propargyl bromide dissolved in 39.73 g of 1-methyl-2-pyrrolidone and 20.73 g of potassium carbonate were added, followed by stirring at 80° C. for 20 hours to allow a reaction to proceed at a phenolic group and an amino group at a polymer terminal.

After the completion of the reaction, the reaction solution was subjected to suction filtration by a Kiriyama-rohto funnel, and to the filtrate, a solution of 2N hydrochloric acid:1-methyl-2-pyrrolidone=1:9 was added so as to make the resultant acidic, which was confirmed using a strip of litmus paper. Subsequently, the resulting solution was added dropwise to a mixture of water:methanol=1:9 for reprecipitation. After dropwise addition, the resultant was subjected to suction filtration by a Buchner funnel and was washed with methanol three times, water twice, and methanol three times in this order, followed by drying the resulting powder in a vacuum dryer for 12 hours.

GPC analysis of the resulting polymer compound (corresponding to the compound of Formula (1-16)) showed the weight average molecular weight to be 14,700 in terms of standard polystyrene and the reaction rate of the phenolic group and the amino group at the terminal to be 52%.

Synthesis Example 14

In a three-necked flask equipped with a stirrer, a thermometer, and a Dimroth condenser, 6.61 g of 2,4-difluorobenzonitrile, 9.16 g of 2,2-bis(3-amino-4-hydroxyphenyl) hexafluoropropane, and 8.66 g of 1,3-bis[2-(4-hydroxyphenyl)-2-propyl]benzene were dissolved in 73.28 g of 1-methyl-2-pyrrolidone, to which 20.73 g of potassium carbonate was added, followed by subjecting the system to replacement with nitrogen.

The resultant was subjected to a reaction in an oil bath at 160° C. for 20 hours.

After the completion of the reaction, cooling was performed until the temperature inside the system reached 80° C., to which 14.13 g of propargyl bromide dissolved in 27.96 g of 1-methyl-2-pyrrolidone was added, followed by stirring at 80° C. for 20 hours to allow a reaction to proceed at a phenolic group and an amino group at a polymer terminal.

After the completion of the reaction, the reaction solution was subjected to suction filtration by a Kiriyama-rohto funnel, and to the filtrate, a solution of 2N hydrochloric acid:1-methyl-2-pyrrolidone=1:9 was added so as to make the resultant acidic, which was confirmed using a strip of litmus paper. Subsequently, the resulting solution was added dropwise to a mixture of water:methanol=1:9 for reprecipitation. After dropwise addition, the resultant was subjected to suction filtration by a Buchner funnel and was washed with methanol three times, water twice, and methanol three times in this order, followed by drying the resulting powder in a vacuum dryer for 12 hours.

GPC analysis of the resulting polymer compound (corresponding to the compound of Formula (1-17)) showed the weight average molecular weight to be 12,700 in terms of standard polystyrene and the reaction rate of the phenolic group and the amino group at the terminal to be 50%.

Synthesis Example 15

In a three-necked flask equipped with a stirrer, a thermometer, and a Dimroth condenser, 20.86 g of 2,6-difluorobenzonitrile, 54.91 g of 2,2-bis(4-hydroxyphenyl) hexafluoropropane, and 1.16 g of 2,2'-bis(4-hydroxy-3,5-dihydroxymethylphenyl)propane were dissolved in 489.50 g of 1-methyl-2-pyrrolidone, to which 20.93 g of potassium carbonate was added, followed by subjecting the system to replacement with nitrogen.

The resultant was subjected to a reaction in an oil bath at 160° C. for 20 hours.

After the completion of the reaction, the reaction solution was subjected to suction filtration by a Kiriyama-rohto funnel, and to the filtrate, a solution of 1N hydrochloric acid:1-methyl-2-pyrrolidone=1:9 was added so as to make the resultant acidic, which was confirmed using a strip of litmus paper. Subsequently, the resulting solution was added dropwise to a mixture of water:methanol=1:9 for reprecipitation. After dropwise addition, the resultant was subjected to suction filtration by a Buchner funnel and was washed with methanol three times, water twice, and methanol three times in this order, followed by drying the resulting powder in a vacuum dryer for 12 hours.

10 g of the resulting powder was dissolved in 100 g of tetrahydrofuran, to which 2.16 g of potassium carbonate and 1.69 g of propargyl bromide were added, followed by allowing a reaction to proceed under reflux for 20 hours. The resulting reaction solution was subjected to suction filtration by a Kiriyama-rohto funnel, and to the resulting solution, a solution of 1N hydrochloric acid:1-methyl-2-pyrrolidone=1:9 was added so as to make the resultant acidic, which was confirmed using a strip of litmus paper. Subsequently, the resulting solution was added dropwise to a mixture of water:methanol=1:9 for reprecipitation. After dropwise addition, the resultant was subjected to suction filtration by a Buchner funnel and was washed with methanol three times, water twice, and methanol three times in this order, followed by drying the resulting powder in a vacuum dryer for 12 hours.

GPC analysis of the resulting polymer compound (corresponding to the compound of Formula (1-18)) showed the weight average molecular weight to be 18,000 in terms of standard polystyrene.

Synthesis Example 16

In a three-necked flask equipped with a stirrer, a thermometer, and a Dimroth condenser, 29.05 g of 4,4'-difluorobenzophenone, 50.43 g of 2,2-bis(4-hydroxyphenyl) hexafluoropropane, and 1.06 g of 2,2'-bis(4-hydroxy-3,5-dihydroxymethylphenyl)propane were dissolved in 519.13 g of 1-methyl-2-pyrrolidone, to which 21.82 g of potassium carbonate was added, followed by subjecting the system to replacement with nitrogen.

The resultant was subjected to a reaction in an oil bath at 160° C. for 20 hours.

The reaction solution was subjected to suction filtration by a Kiriyama-rohto funnel, and to the filtrate, a solution of 1N hydrochloric acid:1-methyl-2-pyrrolidone=1:9 was added so as to make the resultant acidic, which was confirmed using a strip of litmus paper. Subsequently, the resulting solution was added dropwise to a mixture of water:methanol=1:9 for reprecipitation. After dropwise addition, the resultant was subjected to suction filtration by a Buchner funnel and was washed with methanol three times, water twice, and methanol three times in this order, followed by drying the resulting powder in a vacuum dryer for 12 hours.

10 g of the resulting powder was dissolved in 100 g of tetrahydrofuran, to which 2.16 g of potassium carbonate and 1.97 g of allyl bromide were added, followed by allowing a reaction to proceed under reflux for 20 hours. The resulting reaction solution was subjected to suction filtration by a Kiriyama-rohto funnel, and to the resulting solution, a solution of 1N hydrochloric acid:1-methyl-2-pyrrolidone=1:9 was added so as to make the resultant acidic, which was confirmed using a strip of litmus paper. Subsequently, the resulting solution was added dropwise to a mixture of water:methanol=1:9 for reprecipitation. After dropwise addition, the resultant was subjected to suction filtration by a Buchner funnel and was washed with methanol three times, water twice, and methanol three times in this order, followed by drying the resulting powder in a vacuum dryer for 12 hours.

GPC analysis of the resulting polymer compound (corresponding to the compound of Formula (1-40)) showed the weight average molecular weight to be 27,000 in terms of standard polystyrene.

Synthesis Example 17

In a three-necked flask equipped with a stirrer, a thermometer, and a Dimroth condenser, 20.44 g of 2,6-difluorobenzonitrile, 50.44 g of 2,2-bis(4-hydroxyphenyl)hexafluoropropane, and 1.12 g of 2,2-bis(3-amino-4-hydroxyphenyl)hexafluoropropane were dissolved in 528.50 g of 1-methyl-2-pyrrolidone, to which 63.43 g of potassium carbonate was added, followed by subjecting the system to replacement with nitrogen.

The resultant was subjected to a reaction in an oil bath at 160° C. for 20 hours.

After the completion of the reaction, cooling was performed until the temperature inside the system reached 80° C., to which 17.84 g of propargyl bromide dissolved in 53.53 g of 1-methyl-2-pyrrolidone, 6.02 g of potassium iodide, and 22.80 g of potassium carbonate were added, followed by stirring at 80° C. for 20 hours to allow a reaction to proceed at a phenolic group and an amino group at a polymer terminal.

The reaction solution was subjected to suction filtration by a Kiriyama-rohto funnel, and to the filtrate, a solution of 1N hydrochloric acid:1-methyl-2-pyrrolidone=1:9 was added so as to make the resultant acidic, which was confirmed using a strip of litmus paper. Subsequently, the resulting solution was added dropwise to a mixture of water:methanol=1:9 for reprecipitation. After dropwise addition, the resultant was subjected to suction filtration by a Buchner funnel and was washed with methanol three times, water twice, and methanol three times in this order, followed by drying the resulting powder in a vacuum dryer for 12 hours.

GPC analysis of the resulting polymer compound (corresponding to the compound of Formula (1-20)) showed the weight average molecular weight to be 23,000 in terms of standard polystyrene.

Synthesis Example 18

In a three-necked flask equipped with a stirrer, a thermometer, and a Dimroth condenser, 20.67 g of 4,4'-difluorobenzophenone, 33.62 g of 2,2-bis(4-hydroxyphenyl)hexafluoropropane, and 1.92 g of 2,2-bis(3-amino-4-hydroxyphenyl)hexafluoropropane were dissolved in 361.12 g of 1-methyl-2-pyrrolidone, to which 20.67 g of potassium carbonate was added, followed by subjecting the system to replacement with nitrogen.

The resultant was subjected to a reaction in an oil bath at 160° C. for 20 hours.

The reaction solution was subjected to suction filtration by a Kiriyama-rohto funnel, and to the filtrate, a solution of 1N hydrochloric acid:1-methyl-2-pyrrolidone=1:9 was added so as to make the resultant acidic, which was confirmed using a strip of litmus paper. Subsequently, the resulting solution was added dropwise to a mixture of water:methanol=1:9 for reprecipitation. After dropwise addition, the resultant was subjected to suction filtration by a Buchner funnel and was washed with methanol three times, water twice, and methanol three times in this order, followed by drying the resulting powder in a vacuum dryer for 12 hours.

10 g of the resulting powder was dissolved in 100 g of tetrahydrofuran and to which, 0.45 g of triethylamine was added, followed by cooling to 0° C. and adding dropwise thereto 0.36 g of acryloyl chloride dissolved in 10 g of tetrahydrofuran over 10 minutes. Subsequently, the resultant was left to increase the temperature, followed by allowing a reaction to proceed for 20 hours. The resulting solution was added dropwise to a mixture of water:methanol=1:9 for reprecipitation. After dropwise addition, the resultant was subjected to suction filtration by a Buchner funnel and was washed with methanol three times, water twice, and methanol three times in this order, followed by drying the resulting powder in a vacuum dryer for 12 hours.

GPC analysis of the resulting polymer compound (corresponding to the compound of Formula (1-42)) showed the weight average molecular weight to be ND in terms of standard polystyrene.

Comparative Synthesis Example 1

In a flask equipped with a stirring device, a refluxer, a thermometer, and a vessel for dropwise addition, 15.00 g of 4,4'-dichlorodiphenyl-sulfone, 12.56 g of 2,2-bis(4-hydroxyphenyl)propane, 8.37 g of potassium carbonate, and 82.61 g of N-methyl-2-pyrrolidone were placed, and the system was subjected to replacement with nitrogen, followed by heating it to reach 160° C. to allow a reaction to proceed for 20 hours. The aromatic polyether ether sulfone thus synthesized was cooled to reach room temperature and was filtered, followed by mixing the collected filtrate with 30 ml of a mixture of N-methyl-2-pyrrolidone:2 mol/l hydrochloric acid=90:10 in volume. Subsequently, the resultant was added to methanol to be purified by reprecipitation.

After washed with methanol and water, vacuum drying was performed at 85° C. for 1 day to obtain an aromatic polyether ether sulfone (corresponding to a compound of Formula (2-1)), which was to be used in Comparative Example 1. GPC analysis of the resulting aromatic polyether showed the weight average molecular weight to be 16,700 in terms of standard polystyrene.

Formula (2-1)

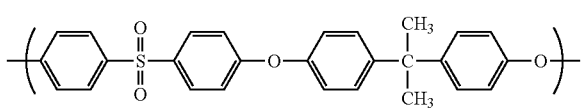

Comparative Synthesis Example 2

Polymethyl methacrylate (manufactured by Wako Pure Chemical Industries, Ltd.), which was a commercially available synthetic acrylic resin, was prepared.

(Evaluation of Solvent Solubility)

To 5 parts by mass of the aromatic polyether obtained in each of Synthesis Examples 1 to 18 or the polymer obtained in either of Comparative Synthesis Examples 1 and 2, 95 parts by mass of either of (1) propylene glycol monomethyl ether (PGME), (2) propylene glycol monomethyl ether acetate (PGMEA), (3) ethyl lactate (EL), (4) cyclohexanone (Cy), (5) N-methyl-2-pyrrolidone (NMP), (6) dimethylacetamide (DMAC), (7) 4-methyl 2-pentanone (MIBK), (8) 5-methyl-2-hexanone (MIAK), (9) ethyl acetoacetate (EAA), (10) γ-butyrolactone (GBL), and (11) cyclopentanone (Cp) was added to evaluate solubility. The results are shown in Table 1. ○ indicates dissolved, Δ indicates slightly dissolved, and x indicates hardly dissolved.

TABLE 1

|  | (1) | (2) | (3) | (4) | (5) | (6) | (7) | (8) | (9) | (10) | (11) |
|---|---|---|---|---|---|---|---|---|---|---|---|
| Synthesis Ex. 1 | ○ | ○ | ○ | ○ | ○ | ○ | ○ | ○ | ○ | ○ | ○ |
| Synthesis Ex. 2 | ○ | ○ | Δ | ○ | ○ | ○ | ○ | ○ | ○ | ○ | ○ |
| Synthesis Ex. 3 | ○ | ○ | ○ | ○ | ○ | ○ | ○ | ○ | ○ | ○ | ○ |
| Synthesis Ex. 4 | ○ | ○ | ○ | ○ | ○ | ○ | ○ | ○ | ○ | ○ | ○ |
| Synthesis Ex. 5 | ○ | ○ | ○ | ○ | ○ | ○ | ○ | ○ | ○ | ○ | ○ |
| Synthesis Ex. 6 | ○ | ○ | ○ | ○ | ○ | ○ | ○ | ○ | ○ | ○ | ○ |
| Synthesis Ex. 7 | ○ | ○ | ○ | ○ | ○ | ○ | ○ | ○ | ○ | ○ | ○ |
| Synthesis Ex. 8 | ○ | ○ | ○ | ○ | ○ | ○ | ○ | ○ | ○ | ○ | ○ |
| Synthesis Ex. 9 | ○ | ○ | ○ | ○ | ○ | ○ | ○ | ○ | ○ | ○ | ○ |
| Synthesis Ex. 10 | ○ | ○ | ○ | ○ | ○ | ○ | ○ | ○ | ○ | ○ | ○ |
| Synthesis Ex. 11 | ○ | ○ | ○ | ○ | ○ | ○ | ○ | ○ | ○ | ○ | ○ |
| Synthesis Ex. 12 | ○ | ○ | ○ | ○ | ○ | ○ | ○ | ○ | ○ | ○ | ○ |
| Synthesis Ex. 13 | ○ | ○ | ○ | ○ | ○ | ○ | ○ | ○ | ○ | ○ | ○ |
| Synthesis Ex. 14 | ○ | ○ | ○ | ○ | ○ | ○ | ○ | ○ | ○ | ○ | ○ |
| Synthesis Ex. 15 | ○ | ○ | ○ | ○ | ○ | ○ | ○ | ○ | ○ | ○ | ○ |
| Synthesis Ex. 16 | ○ | ○ | ○ | ○ | ○ | ○ | ○ | ○ | ○ | ○ | ○ |
| Synthesis Ex. 17 | ○ | ○ | ○ | ○ | ○ | ○ | ○ | ○ | ○ | ○ | ○ |
| Synthesis Ex. 18 | ○ | ○ | ○ | ○ | ○ | ○ | ○ | ○ | ○ | ○ | ○ |
| Comparative Synthesis Ex. 1 | x | x | x | Δ | ○ | Δ | x | x | x | x | x |
| Comparative Synthesis Ex. 2 | ○ | ○ | ○ | ○ | ○ | ○ | ○ | ○ | ○ | ○ | ○ |

The polyethers obtained in Synthesis Examples 1 to 18 showed the same level of solubility as that of the acrylic resin of Comparative Synthesis Example 2 and showed higher solubility than that of the polysulfone obtained in Comparative Synthesis Example 1.

(Evaluation of Heat Resistance)

The heat resistance of the polyethers obtained in Synthesis Examples 1 to 18 and Comparative Synthesis Example 1 and the polymethyl methacrylate of Comparative Synthesis Example 2 was evaluated from the temperature at which loss reached 5% by mass, using a TG-DTA (TG/DTA2010SR manufactured by Bruker AXS K.K.) with the temperature raised at 10° C./minute. The results are shown in Table 2.

TABLE 2

|  | Temperature of 5%-by-mass weight loss |
|---|---|
| Synthesis Example 1 | 505° C. |
| Synthesis Example 2 | 518° C. |
| Synthesis Example 3 | 493° C. |
| Synthesis Example 4 | 476° C. |
| Synthesis Example 5 | 482° C. |
| Synthesis Example 6 | 480° C. |
| Synthesis Example 7 | 511° C. |
| Synthesis Example 8 | 353° C. |
| Synthesis Example 9 | 427° C. |
| Synthesis Example 10 | 380° C. |
| Synthesis Example 11 | 390° C. |
| Synthesis Example 12 | 419° C. |
| Synthesis Example 13 | 428° C. |
| Synthesis Example 14 | 425° C. |
| Synthesis Example 15 | 507° C. |
| Synthesis Example 16 | 510° C. |
| Synthesis Example 17 | 506° C. |
| Synthesis Example 18 | 503° C. |
| Comparative Synthesis Example 1 | 500° C. |
| Comparative Synthesis Example 2 | 323° C. |

The polyethers obtained in Synthesis Examples 1 to 18 showed heat resistance as high as 350° C. or higher, which was higher than that of the acrylic resin of Comparative Synthesis Example 2.

Preparation of Adhesive Composition

Example 1

3 g of the polymer compound obtained in Synthesis Example 1 was dissolved in 12 g of cyclohexanone, followed by filtrating with a polyethylene microfilter having a pore size of 1.0 μm to prepare an adhesive composition including 20% by mass of solid matter.

Example 2

3 g of the polymer compound obtained in Synthesis Example 2 was dissolved in 12 g of cyclohexanone, followed by filtrating with a polyethylene microfilter having a pore size of 1.0 μm to prepare an adhesive composition including 20% by mass of solid matter.

Example 3

3 g of the polymer compound obtained in Synthesis Example 3 was dissolved in 12 g of cyclohexanone, followed by filtrating with a polyethylene microfilter having a pore size of 1.0 μm to prepare an adhesive composition including 20% by mass of solid matter.

Example 4

3 g of the polymer compound obtained in Synthesis Example 4 was dissolved in 12 g of cyclohexanone, followed by filtrating with a polyethylene microfilter having a pore size of 1.0 μm to prepare an adhesive composition including 20% by mass of solid matter.

Example 5

3 g of the polymer compound obtained in Synthesis Example 5 was dissolved in 12 g of cyclohexanone, followed by filtrating with a polyethylene microfilter having a pore size of 1.0 μm to prepare an adhesive composition including 20% by mass of solid matter.

Example 6

3 g of the polymer compound obtained in Synthesis Example 6 was dissolved in 12 g of cyclohexanone, followed by filtrating with a polyethylene microfilter having a pore size of 1.0 μm to prepare an adhesive composition including 20% by mass of solid matter.

Example 7

3 g of the polymer compound obtained in Synthesis Example 7 was dissolved in 12 g of cyclohexanone, followed by filtrating with a polyethylene microfilter having a pore size of 1.0 μm to prepare an adhesive composition including 20% by mass of solid matter.

Example 8

3 g of the polymer compound obtained in Synthesis Example 8 was dissolved in 12 g of cyclohexanone, followed by filtrating with a polyethylene microfilter having a pore size of 1.0 μm to prepare an adhesive composition including 20% by mass of solid matter.

Example 9

3 g of the polymer compound obtained in Synthesis Example 9 was dissolved in 12 g of cyclohexanone, followed by filtrating with a polyethylene microfilter having a pore size of 1.0 μm to prepare an adhesive composition including 20% by mass of solid matter.

Example 10

3 g of the polymer compound obtained in Synthesis Example 10 was dissolved in 9 g of cyclohexanone, followed by filtrating with a polyethylene microfilter having a pore size of 1.0 μm to prepare an adhesive composition including 25% by mass of solid matter.

Example 11

3 g of the polymer compound obtained in Synthesis Example 11 was dissolved in 5.57 g of cyclopentanone, followed by filtrating with a polyethylene microfilter having a pore size of 1.0 μm to prepare an adhesive composition including 35% by mass of solid matter.

Example 12

3 g of the polymer compound obtained in Synthesis Example 12 was dissolved in 7 g of cyclopentanone, followed by filtrating with a polyethylene microfilter having a pore size of 1.0 μm to prepare an adhesive composition including 30% by mass of solid matter.

Example 13

3 g of the polymer compound obtained in Synthesis Example 13 was dissolved in 7 g of cyclopentanone, followed by filtrating with a polyethylene microfilter having a pore size of 1.0 μm to prepare an adhesive composition including 30% by mass of solid matter.

Example 14

3 g of the polymer compound obtained in Synthesis Example 14 was dissolved in 7 g of cyclopentanone, followed by filtrating with a polyethylene microfilter having a pore size of 1.0 μm to prepare an adhesive composition including 30% by mass of solid matter.

Example 15

3 g of the polymer compound obtained in Synthesis Example 15 was dissolved in 12 g of cyclohexanone, followed by filtrating with a polyethylene microfilter having a pore size of 1.0 μm to prepare an adhesive composition including 20% by mass of solid matter.

Example 16

3 g of the polymer compound obtained in Synthesis Example 16 was dissolved in 12 g of cyclohexanone, followed by filtrating with a polyethylene microfilter having a pore size of 1.0 μm to prepare an adhesive composition including 20% by mass of solid matter.

Example 17

3 g of the polymer compound obtained in Synthesis Example 17 was dissolved in 12 g of cyclohexanone, followed by filtrating with a polyethylene microfilter having a pore size of 1.0 μm to prepare an adhesive composition including 20% by mass of solid matter.

Example 18

3 g of the polymer compound obtained in Synthesis Example 18 was dissolved in 12 g of cyclohexanone, followed by filtrating with a polyethylene microfilter having a pore size of 1.0 μm to prepare an adhesive composition including 20% by mass of solid matter.

Comparative Example 1

The aromatic polyether obtained in Comparative Synthesis Example 1 was dissolved in N-methyl-2-pyrrolidone, followed by filtrating with a polyethylene microfilter having a pore size of 1.0 μm to prepare an adhesive composition including 10% by mass of solid matter.

Comparative Example 2

The polymethyl methacrylate of Comparative Synthesis Example 2 was dissolved in cyclohexanone, followed by filtrating with a polyethylene microfilter having a pore size of 1.0 μm to prepare an adhesive composition including 20% by mass of solid matter.

(Evaluation of Coating Properties)

Each of the adhesive compositions obtained in Examples 1 to 18 and Comparative Examples 1 and 2 was applied to a silicon wafer by spin coating under application conditions of 1,000 rpm for 30 seconds, and was then baked at 100° C. and 200° C. each for 2 minutes to form a film, which was subjected to evaluation. The results are shown in Table 3.

TABLE 3

|  | Coating | Film thickness |
| --- | --- | --- |
| Example 1 | Excellent | 1.7 μm |
| Example 2 | Excellent | 2.1 μm |
| Example 3 | Excellent | 1.7 μm |
| Example 4 | Excellent | 2.0 μm |
| Example 5 | Excellent | 4.3 μm |
| Example 6 | Excellent | 4.1 μm |
| Example 7 | Excellent | 3.2 μm |
| Example 8 | Excellent | 4.7 μm |
| Example 9 | Excellent | 2.5 μm |
| Example 10 | Excellent | 2.8 μm |
| Example 11 | Excellent | 4.7 μm |
| Example 12 | Excellent | 4.6 μm |
| Example 13 | Excellent | 5.1 μm |
| Example 14 | Excellent | 4.4 μm |
| Example 15 | Excellent | 1.6 μm |

TABLE 3-continued

|  | Coating | Film thickness |
| --- | --- | --- |
| Example 16 | Excellent | 1.7 μm |
| Example 17 | Excellent | 1.8 μm |
| Example 18 | Excellent | 2.0 μm |
| Comparative Example 1 | Poor | — |
| Comparative Example 2 | Excellent | 6.5 μm |

As shown in Table 3, a uniform film was not formed due to poor coating in Comparative Example 1, while the aromatic polyethers of the present invention in Examples 1 to 18 and the acrylic resin of Comparative Synthesis Example 2 formed uniform films of 1 μm or thicker.

(Evaluation of Adhesion)

Each of the adhesive compositions obtained in Examples 1 to 18 and Comparative Examples 1 and 2 was applied under application conditions of 1,000 rpm for 30 seconds and was then baked at 100° C. and 250° C. each for 2 minutes to form a film on a silicon wafer. The silicon wafer was cut into a 5-mm square and was placed, with the coated surface downward, on a glass wafer that had been left still standing on a hot plate at 270° C., followed by pressing from above into adhesion, which was evaluated. The results are shown in Table 4. When looked from the side of the glass wafer, the state of adhesion with no void (hole) was evaluated as excellent.

TABLE 4

|  | Adhesion |
| --- | --- |
| Example 1 | Excellent |
| Example 2 | Excellent |
| Example 3 | Excellent |
| Example 4 | Excellent |
| Example 5 | Excellent |
| Example 6 | Excellent |
| Example 7 | Excellent |
| Example 8 | Excellent |
| Example 9 | Excellent |
| Example 10 | Excellent |
| Example 11 | Excellent |
| Example 12 | Excellent |
| Example 13 | Excellent |
| Example 14 | Excellent |
| Example 15 | Excellent |
| Example 16 | Excellent |
| Example 17 | Excellent |
| Example 18 | Excellent |
| Comparative Example 1 | Poor |
| Comparative Example 2 | Excellent |

The adhesive composition obtained in Comparative Example 1 did not achieve uniform adhesion due to poor adhesion, while the adhesive compositions of the present invention in Examples 1 to 18 achieved excellent adhesion as with the adhesive composition of Comparative Example 2.

(Preparation of Sample for Adhesion Force Evaluation)

A sample for adhesion force evaluation of each polymer obtained in Synthesis Example 1, Synthesis Example 3, Synthesis Example 6, Synthesis Example 7, or Comparative Synthesis Example 2 was prepared as follows.

Example 19

The aromatic polyether obtained in Synthesis Example 1 was dissolved in cyclohexanone to prepare an adhesive composition including 30% by mass of solid matter, which was applied to a 4-inch silicon wafer by spin coating under application conditions of 1500 rpm for 30 seconds, followed by baking at 100° C. and 200° C. each for 2 minutes to form a film with thickness of 4.6 μm. The resultant was bonded to a 4-inch glass wafer using a bonding system (VJ-300 manufactured by Ayumi Industries Company Limited) under the conditions of a degree of vacuum of not higher than 10 Pa, a temperature of 280° C., and bonding force of 200 kg, and the resulting wafer was cut into a 1-cm square with a dicing device (DAD321 manufactured by DISCO Corporation) to prepare a sample.

Example 20

The aromatic polyether obtained in Synthesis Example 3 was dissolved in cyclohexanone to prepare an adhesive composition including 30% by mass of solid matter, which was applied to a 4-inch silicon wafer by spin coating under application conditions of 1500 rpm for 30 seconds, followed by baking at 100° C. and 200° C. each for 2 minutes to form a film with thickness of 4.6 μm. The resultant was bonded to a 4-inch glass wafer using a bonding system (VJ-300 manufactured by Ayumi Industries Company Limited) under the conditions of a degree of vacuum of not higher than 10 Pa, a temperature of 240° C., and bonding force of 400 kg, and the resulting wafer was cut into a 1-cm square with a dicing device (DAD321 manufactured by DISCO Corporation) to prepare a sample.

Example 21

The aromatic polyether obtained in Synthesis Example 6 was dissolved in cyclohexanone to prepare an adhesive composition including 30% by mass of solid matter, which was applied to a 4-inch silicon wafer by spin coating under application conditions of 1000 rpm for 30 seconds, followed by baking at 100° C. and 200° C. each for 2 minutes to form a film with thickness of 5.1 μm. The resultant was bonded to a 4-inch glass wafer using a bonding system (VJ-300 manufactured by Ayumi Industries Company Limited) under the conditions of a degree of vacuum of not higher than 10 Pa, a temperature of 260° C., and bonding force of 200 kg, and the resulting wafer was cut into a 1-cm square with a dicing device (DAD321 manufactured by DISCO Corporation) to prepare a sample.

Example 22

The aromatic polyether obtained in Synthesis Example 7 was dissolved in cyclohexanone to prepare an adhesive composition including 30% by mass of solid matter, which was applied to a 4-inch silicon wafer by spin coating under application conditions of 1000 rpm for 30 seconds, followed by baking at 100° C. and 200° C. each for 2 minutes to form a film with thickness of 4.2 μm. The resultant was bonded to a 4-inch glass wafer using a bonding system (VJ-300 manufactured by Ayumi Industries Company Limited) under the conditions of a degree of vacuum of not higher than 10 Pa, a temperature of 240° C., and bonding force of 200 kg, and the resulting wafer was cut into a 1-cm square with a dicing device (DAD321 manufactured by DISCO Corporation) to prepare a sample.

Comparative Example 3

The acrylic resin obtained in Comparative Synthesis Example 2 was dissolved in cyclohexanone to prepare an adhesive composition including 20% by mass of solid matter, which was applied to a 4-inch silicon wafer by spin coating under application conditions of 1300 rpm for 60 seconds, followed by baking at 100° C. and 200° C. each for 2 minutes to form a film with thickness of 5.0 μm. The resultant was bonded to a 4-inch glass wafer using a bonding system (VJ-300 manufactured by Ayumi Industries Company Limited) under the conditions of a degree of vacuum of not higher than 10 Pa, a temperature of 270° C., and bonding force of 400 kg, and the resulting wafer was cut into a 1-cm square with a dicing saw (DAD321 manufactured by DISCO Corporation) to prepare a sample.

(Adhesion Force Evaluation 1)

The both sides of each sample for adhesion force evaluation obtained in Example 19, Example 20, Example 21, Example 22, or Comparative Example 3 were applied with Araldite 2014 (trade name; manufactured by Huntsman Advanced Materials) and were bonded to a jig specifically designed for measuring adhesion force (shearing), followed by evaluation of adhesion force (shearing) using an autograph (autograph AGS-100NX manufactured by SHIMADZU CORPORATION). Adhesion force was measured at a strain rate of 1 mm/minute. The results are shown in Table 5.

TABLE 5

|  | Adhesion force (shearing) |
| --- | --- |
| Example 19 | 1000 N or greater |
| Example 20 | 1000 N or greater |
| Example 21 | 1000 N or greater |
| Example 22 | 1000 N or greater |
| Comparative Example 3 | 708 N |

In Table 5, an adhesion force of 1000 N or greater indicates that it is beyond the capacity of the adhesion force-measuring instrument.

The samples obtained in Example 19, Example 20, Example 21, and Example 22 showed adhesion force higher than that of the sample obtained in Comparative Example 3.

(Adhesion Force Evaluation 2)

Each sample for adhesion force evaluation obtained in Example 19, Example 20, Example 21, Example 22, or Comparative Example 3 was baked in an oven at 350° C. for 1 hour. Subsequently, the both sides of each sample were applied with Araldite 2014 (trade name, epoxy adhesive manufactured by Huntsman Advanced Materials) and were bonded to a jig specifically designed for measuring adhesion force (shearing), followed by evaluation of adhesion force (shearing) using an autograph (autograph AGS-100NX manufactured by SHIMADZU CORPORATION). Adhesion force was measured at a strain rate of 1 mm/minute. The results are shown in Table 6.

TABLE 6

|  | Adhesion force (shearing) |
| --- | --- |
| Example 19 | 1000 N or greater |
| Example 20 | 1000 N or greater |
| Example 21 | 1000 N or greater |
| Example 22 | 1000 N or greater |
| Comparative Example 3 | 409 N |

In Table 6, an adhesion force of 1000 N or greater indicates that it is beyond the capacity of the adhesion force-measuring instrument.

The samples obtained in Example 19, Example 20, Example 21, and Example 22 showed adhesion force higher than that of the sample obtained in Comparative Example 3 after heat treatment, which means they are excellent in heat resistance.

INDUSTRIAL APPLICABILITY

The adhesive composition of the present invention easily dissolves in various organic solvents, has excellent coating properties, can form a thick-enough adhesive layer, which undergoes little thermogravimetric loss during high-temperature processes such as steps of metal bump bonding, CVD, and ion diffusion and achieves excellent bonding, and therefore is expected to be used as a highly heat-resistant adhesive composition that is useful in the manufacture of semiconductor devices.

The invention claimed is:

1. An adhesive composition comprising:
a polymer that contains a unit structure of Formula (1):

   Formula (1)

where $L^1$ is a divalent group of Formula (3) or a divalent group of Formula (4):

   Formula (3)

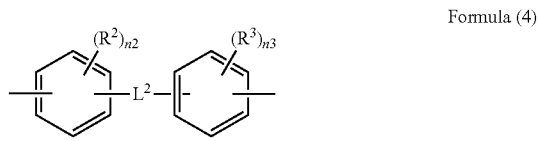   Formula (4)

where $R^1$, $R^2$, and $R^3$ are independently a $C_{1-10}$ alkyl group, a $C_{1-4}$ fluoroalkyl group, a hydroxy group, an allyl group, an allyloxy group, an amino group, a cyano group, a nitro group, an acyl group, an acyloxy group, a carboxy group, a group containing a tertiary-carbon structure, a cyclic alkyl group, or a combination of these, $L^2$ is a sulfonyl group, a carbonyl group, an ester group, an amido group, a sulfinyl group, or a sulfonamido group, and each of n1, n2, and n3 is an integer of 0 to 4, and $T^1$ is a fluoroalkylene group, a cyclic alkylene group, an arylene group having a substituent, or a combination of an arylene group optionally having a substituent and a fluoroalkylene group or a cyclic alkylene group, and that contains, at a terminal or in a side chain or the main chain, at least one group containing a structure of Formula (2-A):

   Formula (2-A)

wherein when Formula (2-A) exists at a terminal or in a side chain of the polymer, it is the following monovalent group: —C≡CH and when Formula (2-A) exists in the main chain of the polymer, it is a divalent group.

2. The adhesive composition according to claim 1, wherein the polymer is a homopolymer containing one kind of unit structure.

3. The adhesive composition according to claim 1, wherein the polymer is a copolymer containing at least two kinds of unit structures.

4. The adhesive composition according to claim 1, comprising:
a polymer that contains a combination of the unit structure of Formula (1) with $L^1$ being the divalent group of Formula (3) and the unit structure of Formula (1) with $L^1$ being the divalent group of Formula (4):

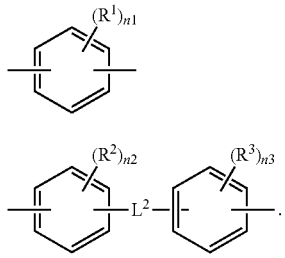

5. The adhesive composition according to claim 1, comprising:
a polymer that contains the unit structure of Formula (1) with $T^1$ being a divalent group of Formula (6):

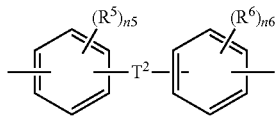

where $R^5$ and $R^6$ are independently a $C_{1-10}$ alkyl group, a $C_{1-4}$ fluoroalkyl group, a hydroxy group, an allyl group, an allyloxy group, an amino group, a cyano group, a nitro group, an acyl group, an acyloxy group, a carboxy group, a group containing a tertiary-carbon structure, a cyclic alkyl group, or a combination of these, each of n5 and n6 is an integer of 0 to 4, and $T^2$ is a fluoroalkylene group, or a combination of a fluoroalkylene group and a cyclic alkylene group.

6. The adhesive composition according to claim 1, wherein, in Formula (3), $R^1$ has at least a cyano group and n1 is an integer of 1 to 4.

7. The adhesive composition according to claim 5, wherein, in Formula (3),

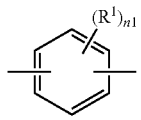

$R^1$ has at least a cyano group and n1 is an integer of 1 to 4.

8. The adhesive composition according to claim 1, wherein, in Formula (4), $L^2$ is a sulfonyl group or a carbonyl group.

9. The adhesive composition according to claim 5, wherein, in Formula (4),

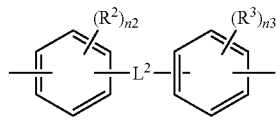

$L^2$ is a sulfonyl group or a carbonyl group.

10. The adhesive composition according to claim 1, further comprising:
a polymer that contains a unit structure of Formula (7):

$$+L^3\text{-O-}T^3\text{-O}+\qquad\qquad \text{Formula (7)}$$

where $L^3$ is the divalent group of Formula (3) or Formula (4), shown above,
and $T^3$ is an alkylene group, a sulfonyl group, a carbonyl group, a $C_{6-30}$ arylene group, or a combination of these.

11. The adhesive composition according to claim 10, wherein the arylene group is a phenylene group, a naphthylene group, or an anthrylene group.

12. The adhesive composition according to claim 10, wherein $T^3$ is a divalent group of Formula (8):

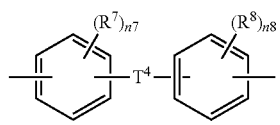

where each of $R^7$ and $R^8$ is a $C_{1-10}$ alkyl group, a $C_{1-4}$ fluoroalkyl group, a hydroxy group, an allyl group, an allyloxy group, an amino group, a cyano group, a nitro group, an acyl group, an acyloxy group, a carboxy group, a group containing a tertiary-carbon structure, a cyclic alkyl group, or a combination of these, each of n7 and n8 is an integer of 0 to 4, and $T^4$ is an alkylene group, a sulfonyl group, a carbonyl group, a $C_{6-30}$ arylene group, or a combination of these.

13. The adhesive composition according to claim 1, further comprising:
a solvent, wherein
the adhesive composition has a viscosity of 0.001 to 5,000 ·s.

14. A laminate comprising:
an adhesive layer formed from the adhesive composition according to claim 1, the adhesive layer being interposed between a first material being bonded and a second material being bonded that is of the same kind as or of a different kind from the first material, wherein the adhesive layer has a thickness of 0.1 μm to 200 μm.

15. The laminate according to claim 14, wherein the materials being bonded are each a silicon substrate, a glass substrate, a resin substrate, or a ceramic substrate.

16. The adhesive composition according to claim 1, wherein weight average molecular weight of the polymer is 1000 to 1,000,000.

17. The adhesive composition according to claim 1, wherein the group containing a tertiary-carbon structure is a tertiary butyl group.

\* \* \* \* \*